United States Patent
Russo et al.

(10) Patent No.: US 7,146,387 B1
(45) Date of Patent: Dec. 5, 2006

(54) SYSTEM AND METHOD FOR CONFIGURING AND PERFORMING APPLICATION BACKUPS AND RESTORES IN DIVERSE ENVIRONMENTS

(75) Inventors: Joseph P. Russo, Millbury, MA (US); Eddie Pavkovic, Westford, MA (US); Benoit J. Merlet, Chelmsford, MA (US); Jeffrey S. Phillips, Northbridge, MA (US); Puneesh Chaudhry, Milford, MA (US)

(73) Assignee: EMC Corporation, Hopkinton, MA (US)

(*) Notice: Subject to any disclaimer, the term of this patent is extended or adjusted under 35 U.S.C. 154(b) by 497 days.

(21) Appl. No.: 10/024,971

(22) Filed: Dec. 19, 2001

(51) Int. Cl.
*G06F 17/30* (2006.01)
*G06F 3/00* (2006.01)

(52) U.S. Cl. ............ 707/204; 707/10; 707/202; 707/203; 707/205; 719/328

(58) Field of Classification Search ............ 707/204, 707/10, 202, 103 X, 104.1, 203, 201, 205; 345/764, 65, 731, 347, 352; 711/162; 705/37; 709/227; 719/328; 370/352
See application file for complete search history.

(56) References Cited

U.S. PATENT DOCUMENTS

| | | | | |
|---|---|---|---|---|
| 5,671,398 A | * | 9/1997 | Neubauer | 703/23 |
| 5,778,395 A | * | 7/1998 | Whiting et al. | 707/204 |
| 5,787,413 A | * | 7/1998 | Kauffman et al. | 707/2 |
| 6,128,012 A | * | 10/2000 | Seidensticker et al. | 345/685 |
| 6,480,903 B1 | * | 11/2002 | Voutaz et al. | 719/328 |
| 6,553,378 B1 | * | 4/2003 | Eschelbeck | 707/10 |
| 6,590,590 B1 | * | 7/2003 | Wen et al. | 345/764 |
| 6,684,229 B1 | * | 1/2004 | Luong et al. | 707/204 |
| 6,697,823 B1 | * | 2/2004 | Otsuka et al. | 707/204 |
| 6,721,809 B1 | * | 4/2004 | Roy et al. | 719/328 |
| 6,728,848 B1 | * | 4/2004 | Tamura et al. | 711/162 |
| 7,007,041 B1 | * | 2/2006 | Multer et al. | 707/201 |
| 2001/0044805 A1 | * | 11/2001 | Multer et al. | 707/201 |
| 2002/0054587 A1 | * | 5/2002 | Baker et al. | 370/352 |
| 2003/0011630 A1 | * | 1/2003 | Knowlton et al. | 345/731 |
| 2004/0073681 A1 | * | 4/2004 | Fald | 709/227 |
| 2004/0236659 A1 | * | 11/2004 | Cazalet et al. | 705/37 |

* cited by examiner

*Primary Examiner*—Thuy N. Pardo
(74) *Attorney, Agent, or Firm*—K. Gupta; R. K. Perkins

(57) ABSTRACT

This invention is a system and method for a system and method for interfacing with a user for a client application for carrying out backup and restore operations and related configuration. The method includes presenting a user with a user interface for performing a dialogue and using information acquired in the dialogue for performing a configuration or a backup or restore operation.

11 Claims, 21 Drawing Sheets

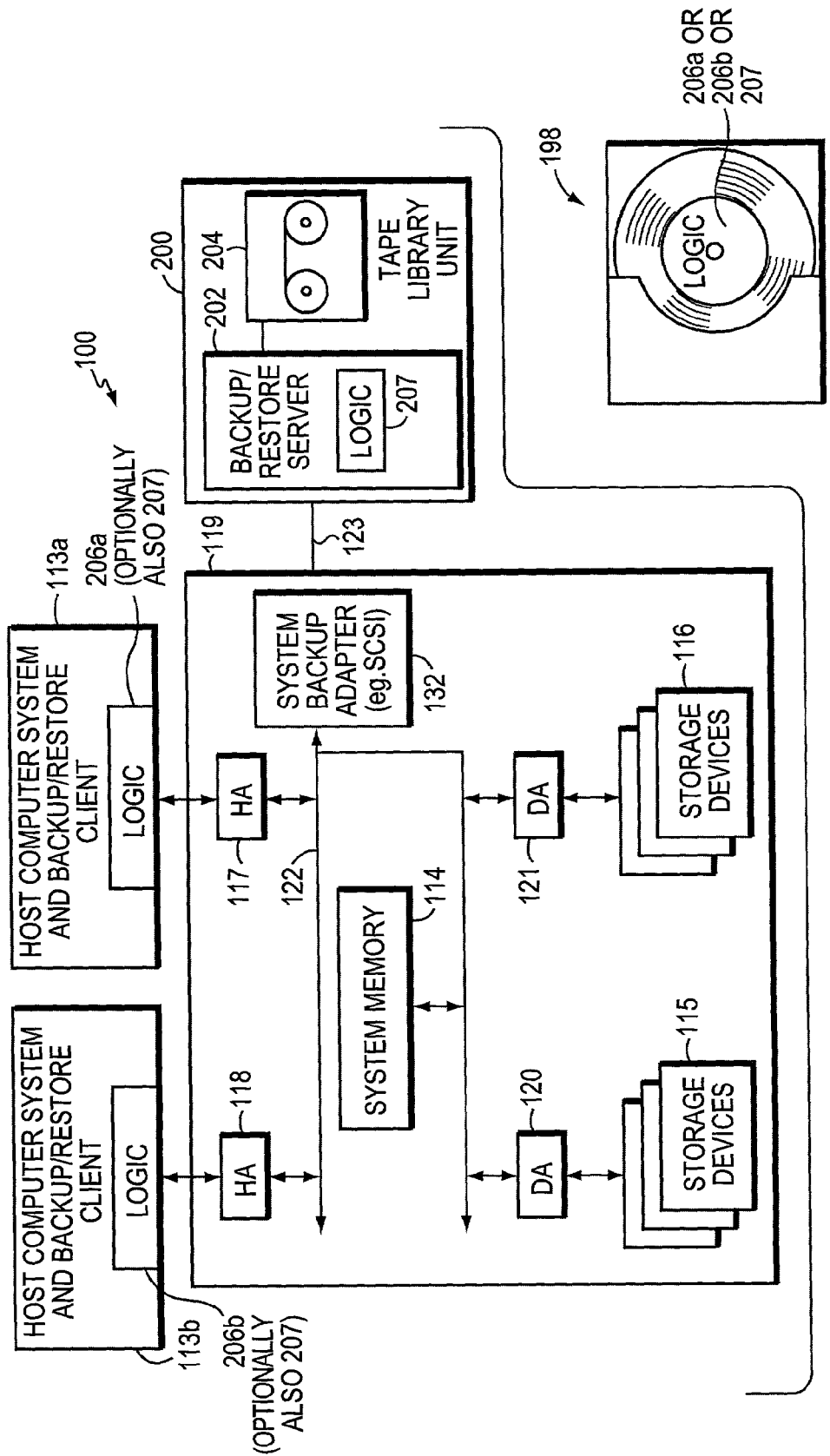

SYSTEM AND METHOD FOR CONFIGURING AND PERFORMING APPLICATION BACKUPS AND RESTORES IN DIVERSE ENVIRONMENTS

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to managing access to data in a data storage environment, and more particularly to a system and method for configuring and performing backups and restores of data in diverse environments.

BACKGROUND OF THE INVENTION

As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g. disk drives. The one or more processors perform their respective operations using the storage system. To minimize the chance of data loss, the computer systems also can include a backup storage system in communication with the primary processor and the data storage system. Often the connection between the one or more processors and the backup storage system is through a network in which case the processor is sometimes referred to as a "backup client."

The backup storage system can include a backup storage device (such as tape storage or any other storage mechanism), together with a system for placing data into the storage device and recovering the data from that storage device. To perform a backup, the client copies data from the shared storage system across the network to the backup storage system. Thus, an actual data file may be communicated over the network to the backup storage device.

The shared storage system corresponds to the actual physical storage. For the client to write the backup data over the network to the backup storage system, the client first converts the backup data into file data i.e., the client retrieves the data from the physical storage system level, and converts the data into application level format (e.g. a file) through a logical volume manager level, a file system level and the application level. When the backup storage device receives the data file, the backup storage system can take the application level data file, and convert it to its appropriate file system level format for the backup storage system. The data can then be converted through the logical volume manager level and into physical storage.

Many data storage systems include backup utilities, which help automate the backup process. These backup utilities are available as systems built into or connected with the data storage system. A typical backup utility provides scripts to perform backup procedures, and a user interface to allow systems administrators to configure and run the backup scripts. The backup utility then performs the task of communicating with host systems, backing up (or restoring) the data, and returning the data storage system and host systems to full access.

The backup utilities must interface and work with a large variety of host system hardware, operating systems, and software. The backup utility must properly configure the scripts to work with any host system and backup tools, each of which has different (and possibly unknown) parameters. Therefore, present day backup utilities must gather information by inquiring from the system administrator about the host and database systems. Many such backup utilities use command line data entry techniques. This process is tedious and limits the usefulness of the automation the backup utilities are supposed to provide. Although, there have been recent advancements in the art by EMC Corporation, the assignee of this invention, that provide a user interface for configuring a system for backup but none that cooperates to carry out the complete process of backup and restore for such a configured system.

Further, the variety of information required by the backup utilities varies greatly. Depending on the type of backup to be performed (for example, a full backup or an incremental backup), the backup utility requires different information about the host systems, and will configure the host systems differently for the specified type of backup. The same variability is present for restore operations.

The EMC Data Manager (EDM) which includes one or more backup utilities is capable of backup and restore over a network, as described in numerous publications available from EMC of Hopkinton, Mass., including the EDM User Guide (Network) "Basic EDM Product Manual". For performance improvements, a backup storage architecture in which a direct connection is established between the shared data storage system and the backup storage system was conceived. Such a system is described in U.S. Pat. No. 6,047,294, assigned to assignee of the present invention, and entitled Logical Restore from a Physical Backup in Computer Storage System and herein incorporated by reference.

In such an architecture as that employed by EDM, there are backup servers that carry out the backing up and restoring operations and backup clients, which may be software applications (e.g. a database) and/or computers using such applications and associated data. Backup servers and clients and utilities may usually be found in a typical backup/restore environment. There is a need for a tool that will allow a backup or restore service to interface with a user for a client application for carrying out a backup or restore operation and any related configuration required for such.

SUMMARY OF THE INVENTION

This invention is a system and method a system and method for interfacing with a user for a client application for carrying out backup and restore operations and related configuration.

The method includes presenting a user with a graphical user interface for performing a dialogue and using information acquired in the dialogue for performing a backup or restore operation.

In an alternative embodiment the graphical user interface is created using data structures created by function calls that are part of an application program interface. In another embodiment, the data structures are shared by more than one application program interface.

In another embodiment, the more than one application program interface includes an application program interface that is directed toward configuring a client application for backup or restore. The more than one application program interface includes an application program interface that is directed toward interfacing with a client application for backup or restore. Another application program interface that is shared and used by other interfaces is directed toward browsing a client application for objects to backup.

In an alternative embodiment, the invention includes a system for carrying out method steps. In another alterative embodiment, the invention includes a program product for carrying out method steps.

BRIEF DESCRIPTION OF THE DRAWINGS

The above and further advantages of the present invention may be better under stood by referring to the following description taken into conjunction with the accompanying drawings in which:

FIG. 1 is a block diagram of a data storage network including host computer systems which comprise backup/restore clients, a data storage system and a backup/restore system and also including logic for enabling the method of the present invention;

FIG. 2 is an exemplary representation of a computer-readable medium encoded with the logic of FIG. 1 for enabling processes of the present invention;

DETAILED DESCRIPTION OF THE PREFERRED EMBODIMENT

The methods and apparatus of the present invention are intended for use with data storage systems, such as the Symmetrix Integrated Cache Disk Array system available from EMC Corporation of Hopkinton, Mass. Specifically, this invention is directed to a system and method for interfacing with a user for a client application for carrying out backup and restore operations and related configuration.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 3:
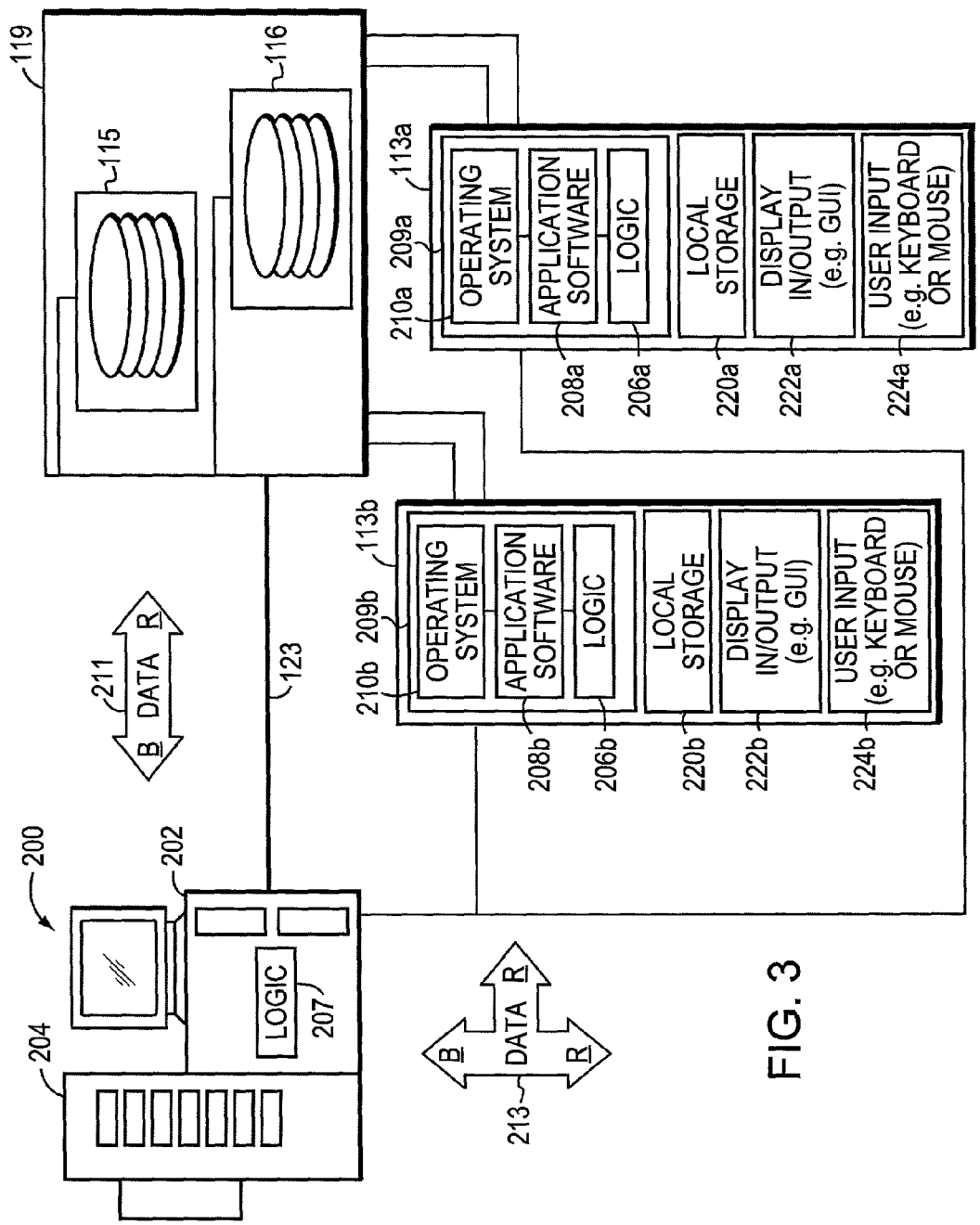
FIG. 3 is a schematic representation of a preferred architecture for elements of the network of FIG. 1.
Figure 4:
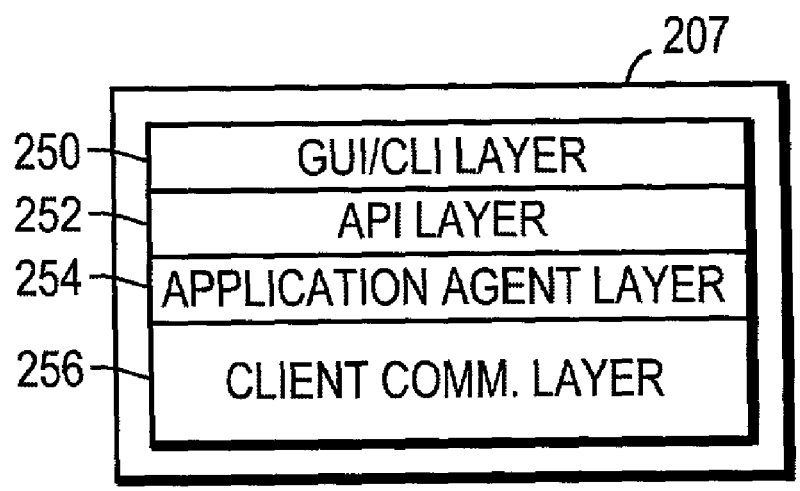
FIG. 4 is a schematic representation of a preferred architectural relationship of software layers comprising the logic of this invention.
Figure 5:
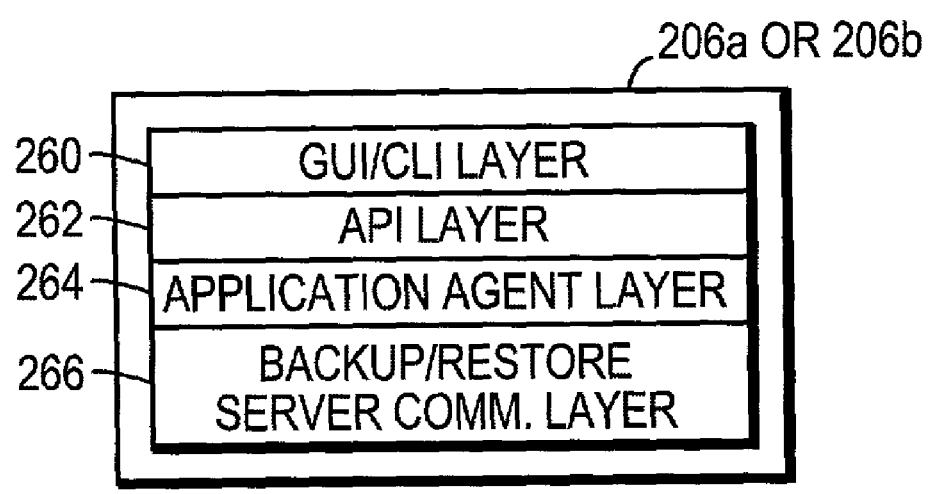
FIG. 5 is another schematic representation of a preferred architectural relationship of software layers comprising the logic of this invention.
Figure 6:
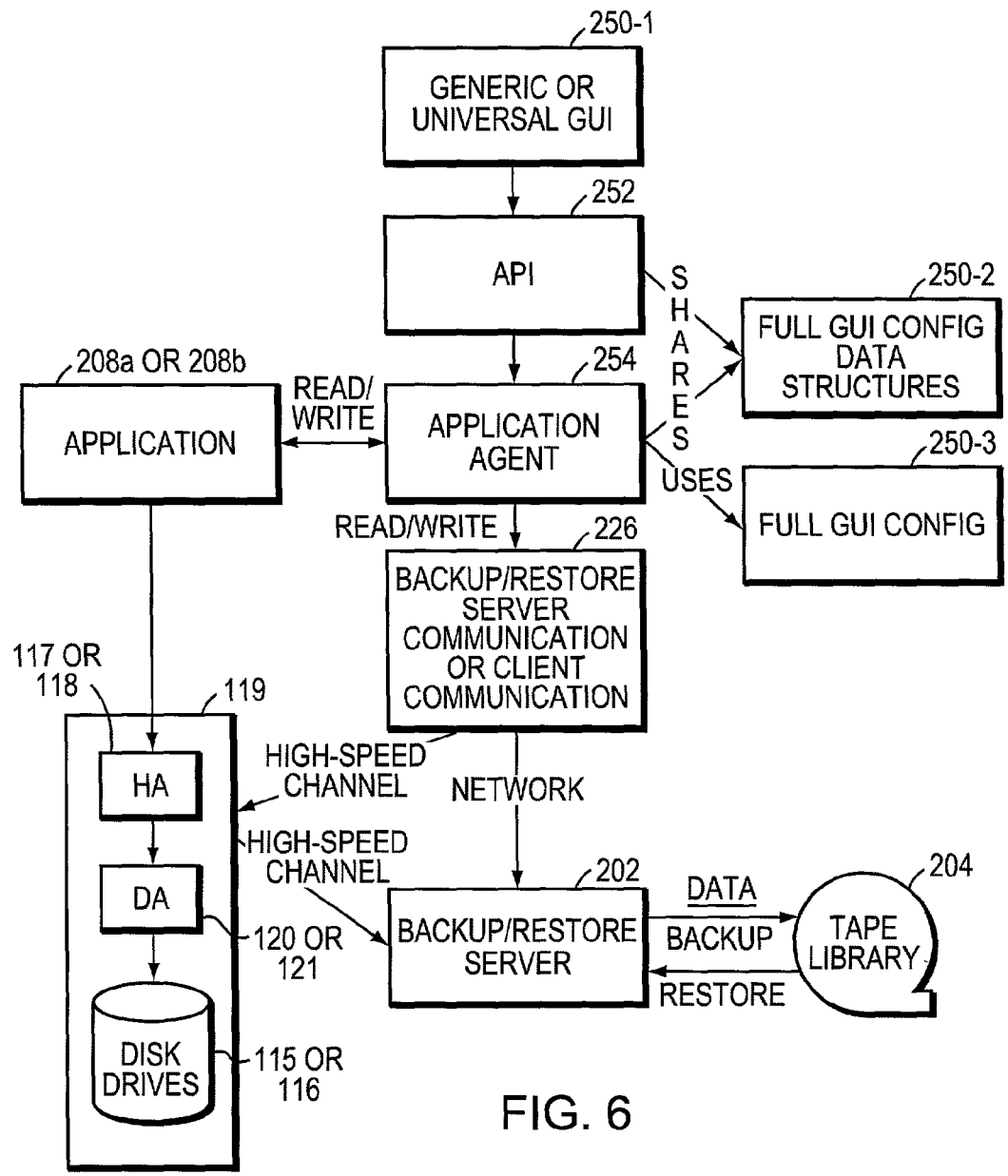
FIG. 6 is a data flow logic diagram showing relationships and interactions of the logic and the other elements of this invention.

The logic for carrying out the method is embodied as part of the system described below beginning with reference to FIG. 1. Preferably the logic is embodied as software code, and C++ is a good choice for a programming language for use in creating such code, which may be encoded on a computer-readable memory as shown in FIG. 2. An architectural relationship of hardware and software elements is shown in FIGS. 3–5. Processes of this invention and interaction of elements of this invention are shown in FIG. 6. Exemplary graphical user interface (GUI) screens enabled by this invention are shown in FIGS. 7–23.

Data Storage Environment Including Logic for this Invention

Referring now to FIG. 1, reference is now made to a data storage network 100 in which the invention is particularly useful and includes a data storage system 119, host computer systems 113a and 113b, and backup system 200.

In a preferred embodiment the data storage system is a Symmetrix Integrated Cache Disk Arrays available from EMC Corporation of Hopkinton, Mass. Such a data storage system and its implementation is fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

The data storage system 119 includes a system memory 114 and sets or pluralities 115 and 116 of multiple data storage devices or data stores. The system memory 114 can comprise a buffer or cache memory; the storage devices in the pluralities 115 and 116 can comprise disk storage devices, optical storage devices and the like. However, in a preferred embodiment the storage devices are disk storage devices. The sets 115 and 116 represent an array of storage devices in any of a variety of known configurations.

A host adapter (HA) 117 provides communications between the host system 113 and the system memory 114; disk adapters (DA) 120 and 121 provide pathways between the system memory 114 and the storage device pluralities 115 and 116. A bus 122 interconnects the system memory 114, the host adapters 117 and 118 and the disk adapters 120 and 121. Each system memory 114 and 141 is used by various elements within the respective systems to transfer information and interact between the respective host adapters and disk adapters.

A backup storage system 200 is connected to the data storage system 119. The backup storage system is preferably an EMC Data Manager (EDM) backup and restore data server 202 with tape library 204 connected to the data storage system as described in EDM Symmetrix Connect User Guide, P/N 300-113-005-04 Rev. D, September 2000, available from EMC Corporation of Hopkinton, Mass. Backup/restore server 202 includes Logic 207 as part of the server, and the tape library unit 204 may include tape medium (not shown) and a robotic picker mechanism (also not shown) as is available on the preferred EDM system. The direct connection between the shared storage system and the backup storage system may be provided as a high-speed data channel 123 such as a SCSI cable or one or more fiber-channel cables. In this system, a user may be permitted to backup data over the network or the direct connection.

Regarding terminology, backup systems typically have a counterpart in restore systems, so for the sake of simplicity, reference herein may be to backup systems and their associated elements without direct reference to restore systems, but one skilled in the art will appreciate the mutual applicability of backup and restore concepts to each other.

Logic 207 is installed and becomes part of the EDM for carrying out the method of this invention and the EDM becomes at least part of a system for carrying out the invention. Logic 207 may also be alternatively installed on a host computer, or as sometimes referred to for the same machine, a backup/restore client, in which case it would reside just as Logic 206a–b are shown in FIG. 1 in computers 113a–b.

Logic 207 and 206a–b are preferably embodied as software for carrying out the methods of this invention and is preferably included at least as part of a backup/restore server 202 in communication with the data storage system 119 through an adapter 132 (e.g., a SCSI adapter) along communication path 123. The Logic 207 and 206a–b of this invention, in a preferred embodiment are each computer program code written in language format including API's for either configuring backup servers, clients, or utilities or for interfacing to carry out backup and restore operations. In a preferred embodiment the software including the API's is in C or C++ program code. However, it may be implemented other ways, such as being Unix-based with daemons for execution.

Referring to FIG. 2, the Logic 207 and 206a–b of this invention may be carried out from a computer-readable medium such as CD-ROM 198 encoded with the respective code that acts in cooperation with normal computer electronic memory as is known in the art. Nevertheless, one skilled in the computer arts will recognize that the logic, which may be implemented interchangeably as hardware or software may be implemented in various fashions in accordance with the teachings presented now.

Referring again to FIG. 1, generally speaking, the data storage system 119 operates in response to commands from one or more computer or host systems, such as the host systems 113a and 113b, that are each connected via a host adapter, such as host adapters 117 and 118. The host adapters 117 and 118 transfer commands to a command buffer that is part of system memory 114. The command buffer stores data structures and write requests that the disk adapters generate. The disk adapters, such as the disk adapters 120 or 121, respond by effecting a corresponding operation using the information in a command buffer. The selected disk adapter then initiates a data operation. Reading operations transfer data from the storage devices to the system memory 114 through a corresponding disk adapter and subsequently transfer data from the system memory 114 to the corresponding host adapter, such as host adapter 117 when the host system 113a initiates the data writing operation.

Reference is now made to FIGS. 1 and 3. The computer systems 113a–b may be any conventional computing system having electronic memory 209a–b for running software. In such memory is loaded and running an operating system 210a–b, such as a Microsoft Windows NT or Windows 2000.

Application Software 208a–b, such as Microsoft Exchange or Microsoft SQL Server 2000 available from Microsoft (Microsoft Corporation is headquartered in Redmond, Wash.) also runs in memory 209a–b, and each application controls significant amounts of data which must be periodically backed up to the backup server. The application's data may be stored on the data storage system's data storage devices 115 and 116 or on the respective local storage device 220a–b.

The Application on the Client computer is referred to herein as a backup or restore client. Generally a backup involves movement of data in the direction denoted by arrowhead "B" of arrow 211 or 213, and a restore in the opposite direction shown as arrowhead "R" of 211 or 213. For controlling such backup or restore operations, a display device 222a–b present the GUI created by the logic 206a–b. And a user may interact with a user input device 224a–b, e.g. a keyboard or mouse.

The Logic 207 and 206a–b include operational layers in a preferred architecture shown in FIG. 4 and FIG. 5, respectively. In general the API's of this invention (and the implementing agents and created data structures) which comprise certain aspects of Logic 207 and 206a–b present a common user interface for backup and restore, operate generally in two aspects: (1) on a backup or restore server's console display area for configuration of backup or restore clients (FIG. 4), although alternatively the display could be on the client computer display, and (2) on a backup or restore client's display area for backup and restore operations (FIG. 5).

Interaction of the elements and operation of the Logic is displayed in FIG. 6, and examples of user interfaces created and used with this invention are shown in FIGS. 7–23, which are all discussed below.

Referring now to FIG. 4, user interfaces for backup and restore client configurations may be GUI or CLI, but GUI is preferred and implemented as GUI/CLI Layer 250 in a preferred architecture (the "Configuration GUI"). API layer 252 is for interfacing with a client for configuration cooperates with layer 250 to create data structures described below, which are shared with API layer 252 for interfacing for client backup and restore operations (FIG. 5). For client backup and restore configuration, the shared data structures are used to form a GUI on the server console's computer display screen. A server application agent layer 254 interacts with layers 252 and a client communication layer 256, which in a preferred embodiment.

The configuration GUI of Logic 207 uses Data Structures shared and also used by Logic 206a–b and which are discussed above. The Configuration GUI gives users a capability to configure new or modify existing configuration objects such as work items, and templates. The GUI supplies this level of functionality by calling a set of routines denoted as the Client Configuration API (CCAPI), which is part of API layer 252. This API contains routines that handle the discovery, browsing and marking of client application objects.

Another API, denoted as the Client Interface API (CIAPI) is also part of the API layer 252. This API provides routines for getting the dialogs, discovery, getting the client configuration etc. Another API, denoted as the Client Browser Interface API (CBAPI) is also part of the API layer 252. Each application provides a configuration Agent per backup application, which is part of the Agent Layer 252. There is also at least one Browser, which generates a list of client backup objects for an application. The Agents manage the order of questions to the user in conjunction with the Browser, which needs to implement the CBAPI interface. In general each of the CCAPI, CIAPI, and CBAPI are preferably written in C and C++ program code and shares data elements and management functions that are discussed below.

Preferably, the Configuration GUI calls the functions provided by the respective API in a specified order. The API returns data structures and a user interface 222-b is presented for client configuration on the server's display screen. In this context, a client refers to a backup client, which as described above refers to the Application Software 208a–b (e.g. a Microsoft SQL Server) and associated data.

The invention allows creation and display of a set of dialog boxes on the fly to the user, which contain enough display information and questions, which the user can answer for configuration. And it also allows storing of a user's responses in a generic way for passing to the backup server 202 where they can be in turn then be sent back to the client for interpretation until enough information is acquired about the client.

For the configuration, the communication between the client and the GUI takes place by exchanging a set of dialogs. Using the information provided by the client, the GUI displays the dialog to the user, gets the user's inputs and sends the dialog back to the client. The client then interprets the user inputs and validates them.

To simplify the process of dialog creation on the fly, the GUI will have a set of predefined dialog types, from which the client can choose the ones that suit the situation. The clients send a Dialog structure, which contains a list of fields along with some other information to the GUI. The dialog structure also contains the dialog type, which should be used to display a dialog to the user. Using the dialog type and the list of fields a dialog can be created and displayed to the user.

Preferably, the function calls provided as part of CCAPI return or accept a data structure referred to as a "DialogInfo" structure. A DialogInfo structure is the basis of communication between the agent acting as a function caller and the backup server 202. The DialogInfo structure contains the following: (1) name of the Dialog Box to be displayed to the user; (2) a help file name associated with the named Dialog Box and (3) a list of fields in the Dialog Box, which can contain the current values of dialog fields or can store the values of user inputs depending on need.

Whenever the Configuration GUI calls, for example, the CCAPI to get a DialogInfo structure, the GUI has at its disposal all the information required to: (1) create and display a dialog box to the user; (2) store a user's inputs in the appropriate type of the field; and (3) display existing/default values for the fields if they exist; and (4) send the user inputs to the client without needing to interpret it. Each of these items is discussed below.

With regard to creating and displaying a dialog box to the user the following applies. The dialog is created on the basis of the number and types of fields in the DialogInfo structure. As mentioned earlier, the GUI picks up an appropriate dialog template and with the aid of the information in the DialogInfo structures, creates and displays the dialog.

Regarding, storing a user's inputs in the appropriate type of the field, the following applies. During configuration the user will fill in values in some fields, select some entries in a list etc. This user input needs to be stored and sent back to the client. Using the field name of the dialog, the user's inputs can be stored in appropriate field in the list of fields. Because the fields also contain a field type, the caller can use the appropriate type to store the value.

With regard to displaying existing/default values for the fields if they exist, the following applies. During fresh configuration/re-configuration, the user needs to be shown the values of the existing fields and the new inputs need to be stored. The former is achieved by giving a DialogInfo structure to the GUI, which contains fields filled with their default/current value, ready to be displayed.

Finally with regard to sending the user inputs to the client without storing of new inputs is achieved as with the case above, (i.e., fresh configuration), and without needing to interpret it: Once the user has made his selections on a dialog box, the GUI tries to validate the user inputs with the information provided in the fields of the DialogInfo structure. Once the fields are validated the GUI fills all the information in the DialogInfo structures and sends the DialogInfo structure itself to the client, where it can be interpreted.

Common Data Elements

This section defines data elements that are used by all or several of the APIs defined by the Logic 207 and 206a–b of this invention. These structures include the DialogInfo, the various fields associated with the Dialog, the configuration types etc. For all the Field structures, there are preferably two members, currentValue and newValue. The member currentValue contains the value of the field before the user changes it. The user input should be stored in the member newValue.

These are preferred common data structures shared by each of the Logic embodiments and implemented by the respective agent calling appropriate functions through the respective API's denoted with names for identification purposes.

TABLE 1

CC_Status_ty: This data type is the status returned by all calls into the API's.
CC_Instance_ty: This data type contains information about a specific instance, which also includes information about the application of which it is an instance.

TABLE 1-continued

CC_IntField_ty: This data structure is used to store information about a user input or display field, which can have integral values. It contains the information about the current value, and whether it is modifiable or not.
CC_StringField_ty: This is used to store information about a user input or display field, which can have string values. It contains the information about the current value and whether it may be modified.
CC_BoolField_ty: This is used to store information about a user input or display field, which can have boolean values. It contains the information about the current value, the fact whether it is modifiable.
CC_ListField is used to store information about a list of strings to be displayed to the user. The structure also contains information about the no. of elements, if one or more elements in the list are user selectable.
CC_ListElement_ty: This represents an element of the List, which is represented by the CC_ListField.
CC_TreeField_ty: This is used to represent a hierarchical tree of information. The structure contains fields having the information like name of the structure, and whether it is selected or selectable.
CC_FieldType_ty: An enumeration structure that enumerates all the types of fields, which can be used in creating a dialog for the user.
CC_Field_ty: This contains information necessary to read or store the value of a particular field in a dialog box. It contains a Union of all the different types of fields possible like integer, string, list etc. Depending upon the value of the member fieldType, the appropriate member of the Union will be valid.
CC_DialogType_ty: An enumeration, which lists all the types of Dialogs possible.
CC_DialogInfo_ty: This structure contains information about the format of the dialog to be displayed and also contains the fields into which user inputs can be stored and from which previous user inputs can be read (during re-configuration).
CC_InitiationType_ty: An enumeration, which lists all the type of initiations possible.
CC_ConfigType_ty: An enumeration, which lists all possible configuration types available.

Common Data Management Functions

The common data types defined above need some data management functions to create, initialize and destroy the data structures declared above and these are implemented preferably as API functions that may be called by an Application API agent. Although a skilled software engineer may recognize a number of ways to accomplish this, a list of functions, which are similar to C++ methods for a class, operating on certain data structures declared is recommended. Such functions may be callable as separate API's as part of the respective API layer and being implemented by calls from Agent code operating through the respective Logic portion such as that in a respective Application Agent Layer.

Table 2 shows such data management functions which are preferred Function Calls for CCAPI:

TABLE 2

CC_AllocateInstance - Allocate instance(s)
CC_FreeInstance - Free instance(s)
CC_InstanceConstructor - Constructor like function for CC_Instance
CC_InstanceDestructor - Destructor like function for CC_Instance
CC_AllocateDialogInfo - Allocate DialogInfo structure(s)
CC_FreeDialogInfo - Free DialogInfo structure(s)
CC_DialogConstructor - Initializes CC_DialogInfo structure
CC_DialogDestructor - Destructor like function for CC_DialogInfo
CC_AddIntField - Add an IntField to the Dialog
CC_AddStringField - Adds a StringField to the array of fields
CC_AddBoolField - Add a BoolField to the Dialog
CC_AddListField - Add a ListField to the Dialog
CC_AddListElements - Add ListElements to the ListField
CC_AddSingleElementToList - Adds a single ListElement to the ListField
CC_CreateTreeField - Creates a TreeField based on input parameters
CC_AttachFirstChild - Assigns the 2$^{nd}$ TreeField as the child of the 1$^{st}$ one.

TABLE 2-continued

CC_AttachRightSibling - Attaches 2$^{nd}$ TreeField structure of the 1$^{st}$.
CC_AddTreeToDialog - Add the TreeField as a field to the Dialog
CC_AddTreeField - Add user selected TreeField structures.

Descriptions of the CCAPI data management catalogued in above in Table 2 now follow:

CC_AllocateInstance is called to allocate an array of instance structures. This function returns a pointer to CC_Instance_ty back. Function returns NULL on failure.

CC_FreeInstance is called to free an array of instance structures.

CC_InstanceConstructor is called to initialize the CC_Instance structure, with the parameters that are passed in.

CC_InstanceDestructor simulates the destructor of the structure CC_Instance, it frees the allocated memory for all the members and reinitializes the structure to 0 again.

CC_AllocateDialogInfo is called to allocate an array of CC_DialogInfo structures. This function should be used to allocate a DialogInfo structure or an array of DialogInfo structures.

CC_FreeDialogInfo is called to free an array of DialogInfo structures.

CC_DialogConstructor is called to initialize the CC_DialogInfo structure, with the parameters that are passed in.

CC_DialogDestructor is called to free the members of the structure CC_DialogInfo and reinitializes the structure to 0 again. Please note that this function does not free the memory allocated for the structure itself. That needs to be done separately using the function CC_FreeDialogInfo ( ).

CC_AddIntField adds an IntField to the array of fields, which is contained in the DialogInfo structure.

CC_AddStringField adds a StringField to the array of fields, which is contained in the DialogInfo structure.

CC_AddBoolField adds a Boolean field (BoolField) to the array of fields, which is contained in the DialogInfo structure.

CC_AddListField adds a ListField to the array of fields, which is contained in the DialogInfo structure.

CC_AddListElements assigns the strings from the array of strings passed in, to the members of the listField. The elements are in the "not selected" state by default. If you want a different state, change the state accordingly yourself.

CC_AddSingleElementsToList adds a single element to the listField structure passed in. This function assigns the element passed in as the parameter to an individual member of the listField. This is provided for the case when it is not possible to add all the list elements at one go using the function AddListElements.

CC_CreateTreeField creates a TreeField structure based on the input parameters and returns it as a parameter.

CC_AttachFirstChild attaches the 2nd TreeField structure as a child of the first TreeField structure.

CC_AttachRightSibling attaches the 2nd TreeField structure as a sibling of the first TreeField structure.

CC_AddTreeToDialog adds the incoming TreeField structure as a field at the given index in the listOfFields member in the dialog structure which is passed in.

CC_AddTreeField—Add the user selected TreeField structures. This is called to notify the CCS Server of the user selected TreeField structures. This function should be called as long as there are user selected TreeField structures available, which have not yet been added.

Additionally, the CCAPI has certain preferred data elements used in the interface which are not typically shared with the other API'S. They include those data structures shown in Table 3.

TABLE 3

CC_Handle_ty is a handle used to identify a specific configuration context that is started using the CC_StartConfig ( ) operation. Each context maintains state information about the configuration session
CC_KickerConfig_ty represents the configuration information required for a kicker.
CC_SymmPathConfig_ty represents the information required for Symmetrix Path configurations.
CC_ListenerConfig_ty represents the configuration information required for a listener.
CC_WorkerConfig_ty represents the configuration information required for a worker.
CC_NWWorkerConfig_ty represents the configuration information required for a network worker.
CC_FileSystemConfig_ty represents the configuration information required for a filesystem workitem.
CC_BaseNameConfig_ty contains the configuration information for a configuration file.
CC_EBCI_Config_ty contains the logical information for an EBCI backup configuration (e.g. workitems).
CC_SymmConnectConfig_ty contains the logical information for a Direct Connect backup configuration.
CC_XCPIO_Config_ty contains the logical information for an XCPIO backup configuration.
CC_ProxyCopy_Config_ty contains the logical information for a Proxy Copy backup configuration.
CC_BackupConfig_ty represents the configuration information for a logical backup object.

CCAPI function calls or operations, which are typically not shared with the other API's, include:

CC_Start—Called to initialize the CCAPI. This function returns a CC_Handle_ty back, which needs to be passed in to further API calls. Function returns NULL on failure.

CC_End—Called to end the current CCAPI session.

CC_StartConfig—Called to start the configuration process.

CC_StartReConfig—Called to start a re-configuration process.

CC_StartReuseConfig—Configure using an existing configuration as template.CC_StartReuseConfig—Called to start the configuration process using an existing configuration as a template.

CC_GetNextDialogInfo—Get the next DialogInfo structure in the configuration sequence.

CC_GetNextDialogInfo—Called to get the next DialogInfo structure in the configuration sequence. This function assumes that the pointer to the DialogInfo structure passed in has been allocated using a call to CC_AllocateDialogInfo. This is to ensure that there are no problems due to the GUI using a different size for the DialogInfo than the CCS Server. The same dialogInfo structure is returned to the Backup Server 202 by making a call to the API CC_SetDialogInfo. The fields in the dialogInfo structure have their values modified though.

CC_GetPrevDialogInfo—Get the previous DialogInfo structure in the configuration sequence.

CC_GetPrevDialogInfo—Called to get the previous DialogInfo structure in the configuration sequence.

CC_SetDialogInfo—Called to set the results of displaying the dialog box to the user using the DialogInfo structure returned in a call to either CC_GetNextDialogInfo( ) or CC_GetPrevDialogInfo( ). The caller needs to store the user inputs into the DialogInfo structure before making this call.

CC_GetFirstChild—Called to get the first child of a given TreeField structure.

CC_GetNextSibling—Called to get the next right sibling of a given TreeField structure.

CC_GetBackupConfig—Called to get a BackupConfig structure which contains the configuration received from the client based on user inputs in previous calls to Get*DialogInfo ( ) and SetDialogInfo ( ). This function assumes that the BackupConfig structure passed in has been allocated using CC_AllocateBackupConfig.

CC_CreateConfigInfo—Generate the EDM specific backup configuration.

CC_CreateConfigInfo is called to create a list of WorkItemInfo structures which can be generated using the BackupConfig structure which is passed in. This function actually attempts to create new workitems based on the information contained in the structure BackupConfig. If the workitems already exist, then it just modifies their properties if required. This function returns a fully allocated array of WorkItemInfo structures.

CC_EndConfig—Called to end the current configuration session.

CC_CancelConfig—Called to cancel the current configuration session.

CC_GetBackupConfigListForHost—Called to get a list of configured backup objects on the EDM, for a specified host. The information is returned as an array of BackupConfig structures.

CC_GetBackupConfigListForApp—Called to get a list of configured backup objects on the EDM, for the specified application. The information is returned as an array of BackupConfig structures.

CC_GetBackupConfigListForInstance—Called to get a list of configured backup objects on the EDM, for the specified instance. The information is returned as an array of BackupConfig structures.

CC_GetWiInfoForBackupConfig—Called to get a list of WorkItemInfo structures for a specified BackupConfig structure. The information is returned as an array of WorkItemInfo structures. Note that this function is different from the function CC_CreateConfigInfo in the following way: CC_GetWiInfoForBackupConfig is called when the workitems are already created in the eb.cfg file, while CC_CreateConfigInfo is called when the workitems are to be created as part of the configuration CC_GetLastErrorString—Called to get the error string associated with the last occurred error during call to one of the CCAPI functions. The memory pointed to by the returned pointer is volatile and only valid till the next function call to the CCAPI.

CC_GetInstanceListForHost—Called to get the list of instances available for backup on the client machine. The information is returned as an array of Instance structures.
CC_GetFiles—Called to ask the CCS Server to get the files which are required during configuration and copy them on the EDM backup server. The files, which are copied over from the client machine are the help files and the icon files which will be required by the GUI during configuring applications on the client system.

CC_GetFileLocation—Called to get the pathname for the directory where the files copied over from the client are stored.

The CIAPI also uses the shared data elements and data management functions described above, but also has its own specific data elements and function calls which are shown now.

CIAPI independent data elements shown in Table 4 include:

TABLE 4

CI_Handle_ty is a handle used to identify a specific configuration context that is started using the CI_StartConfig( ) operation. Each context maintains state information about the configuration session.
CI_EBCI_Config_ty represents the client related configuration information required for an EBCI configuration.
CI_NW_FilesSystemConfig_ty represents the client related configuration information required for a network FS configuration.
CI_SymmConnectConfig_ty represents the client related configuration information required for a Symm Connect configuration using the preferred EMC Symmetrix Data Storage System.
CI_ProxyCopyConfig_ty represents the client related configuration information required for a Proxy Copy configuration.
CI_CalypsoConfig_ty represents the client related configuration information required for a configuration that takes works with an EMC Product known as Fastrax (once known as Calypso).
CI-BackupConfig_ty contains information about the configuration information which is pertinent to the client. This structure does not contain any server specific configuration information.

The CIAPI also has callable functions for data management and operations that are not typically shared. Such functions include those shown below:

CI_AllocateBackupConfig allocates a list of CI_BackupConfig structures.

CI_FreeBackupConfig frees a list of CI_BackupConfig structures.

CI_BackupConfigConstructor is called to initialize the CI_BackupConfig structure, with the parameters that are passed in.

CI_BackupConfigDestructor is called to free the members of the structure

CI_BackupConfig and reinitializes the structure to 0 again.

CI_SetEBCIConfig sets the EBCI configuration portion of the structure CI_BackupConfig_ty CI_SetXCPIOConfig sets the XCPIO configuration portion of the structure CI_BackupConfig_ty.

CI_SetSymmConnectConfig sets the SymmConnect configuration portion of the structure CI_BackupConfig_ty.

CI_SetSymmConnectConfig sets the ProxyCopy configuration portion of the structure CI_BackupConfig_ty.

CI_Start is called to start using an agent. The agent returns a handle that will be used in all subsequent calls. This function returns a CI_Handle_ty back, which needs to be passed in to further API calls. Function returns NULL on failure.

CI_StartConfig is called to start the configuration process.

CI_StartReConfig is called to start a re-configuration process.

CI_StartReuseConfig is called to start the configuration process using an existing configuration as a template.

CI_GetNextDialogInfo is called to get the next DialogInfo structure in the configuration sequence.

CI_GetPrevDialogInfo is called to get the previous DialogInfo structure in the configuration sequence.

CI_SetDialogInfo is called to set the results of displaying the dialog box to the user using the DialogInfo structure returned in a call to either CI_GetNextDialogInfo( ) or CI_GetPrevDialogInfo( ). The caller needs to store the user inputs into the DialogInfo structure before making this call.

CI_AddTreeFields is called to add the user selected TreeField structures.

CI_GetChildren is called to get the children of a given TreeField structure. The tree returned in this call need not be the complete tree. The Agent/Browser can decide on their own about how much part of the tree do they want to return in one call.

CI_GetSiblings is called to get the siblings of a given TreeField structure. The tree returned in this call need not be the complete tree. The Agent/Browser can decide on their own about how much part of the tree do they want to return in one call.

CI_GetBackupConfig is called to get a CI_BackupConfig structure which contains the configuration received from the client based on user inputs in previous calls to GetDialogInfo( ) and SetDialogInfo( ).

CI_GetLastError String is called to get the error string corresponding to the last error encontered by the agent. This error string is reset after each successful CIAPI call. In this case, CI_GetLastError String( ) returns NULL if called.

CI_EndConfig is called to end the current configuration.

CI_End is called to end the current configuration agent session.

The CBAPI also uses the shared data elements and data management functions described above, but also have its own specific data elements and function calls which are used independently and which are shared with the UCA API described below. The browser functions and data are shared to allow the GUI and an Agent to coordinate the dialog held with a user in order to configure specific client backup objects (CBO's). During configuration the Agent needs be able to generate a list of CBO's available for backup to the user and for which backup and restore operations will actually be performed via the UCA API. Communicating with the Browser can do this. Preferably, more than one Agent can use the same browser.

A general discussion of CBO's follows. During installation of a new client computer, such as 113a–b, on the backup/restore server 202, a list of instances available for backup on the client is established. For configuration "available top-level CBO's", which are available for backup on the client machine are noted.

Regarding available top-level CBO's, an example may be helpful. For most databases like Oracle, or Microsoft SQL it's the list of database instances available on the host that comprise such CBO's. For applications like Exchange for which it may not be possible to generate the list of CBO's, without user input, the top-level CBO's would consist of the application name itself. For filesystem clients the host's file system is one instance of an available top-level CBO. Although available, CBO's are not really capable of being backed up or restored until they are configured for backup as described herein. On the preferred EDM Backup/Restore Server, each instance results in a new entry for use by the GUI during configuration.

During configuration, and for carrying out the backup or restore operation, the appropriate API Agent calls the CBAPI to generate the list of CBO's, which can be marked for configuration by the user (this involves the DialogInfo structure discussed herein). The generated CBO's are returned as a hierarchical tree. For some applications it is possible that the tree may be of a very big size. The CBAPI provides API's using which, given a sub-tree it is possible to query the browser again for the next level of sub-tree. This process can repeat till either there are no more sub-trees available or truncation is otherwise desired.

CBAPI independent data elements and those shared with the UCA API (discussed below) include the CB_Handle_ty, which is a handle used to identify the browse session which is started using the CB_Start operation discussed below.

CBAPI independent function calls, not typically shared with CCAPI and CIAPI, but including those which may be shared with the UCA API (discussed below) may include the following:

CB_Start is called to start a browser operation. The operation can either be the browsing of a specific instance, or to discover the list of instances present on the system. The browser returns a handle that has to be used in the subsequent API calls.

CB_GetNextDialogInfo is called to get the next DialogInfo structure in the sequence of dialogs that need to be displayed to the user before browsing can begin. Examples include, querying about user name, password etc.

CB_GetPrevDialogInfo is called to get the previous DialogInfo structure in the sequence of dialogs which need to be displayed to the user before browsing can begin. Examples include, querying about user name, password etc.

CB_SetDialogInfo is called to set the results of displaying the dialog box to the user using the DialogInfo structure returned in a call to either CB_GetNextDialogInfo ( ) or CB_GetPrevDialogInfo ( ).

CB_GetBrowseTree is called to get the tree of CBO's from the browser.

CB_GetChildren is called to get the children of a given TreeField structure.

CB_GetSiblings is called to get the siblings of a given TreeField structure.

CB_GetInstanceList is called to get the list of instances of available top-level CBO's for backup on the client machine.

CB_GetLastError String is called to get the error string corresponding to the last error encountered by the browser in the session specified by cbHandle. This error string is reset by the browser after each successful CBAPI call.

CB_End is called to end the current browse session.

Referring now to FIG. 5, client user interfaces for backup and restore operations may be GUI or CLI, but GUI is preferred and implemented as GUI/CLI Layer 260 in a preferred architecture. API layer 262 for interfacing with backup and restore operations cooperates with layer 260 to create data structures described below and appearing as a GUI on a client computer's display screen (FIGS. 7–23). API Layer 262 may comprise one or more API's and is denoted as a Universal Client Architecture API (UCA API). The UCA API provides a common interface for implementing user interfaces for the preferred EDM server backup and restore for such EDM supported application agents.

In a preferred embodiment the UCA API includes the following callable functions shown in table 5. The functions are called and implemented by an Application Agent layer 264 to create certain data structures appearing as GUI 300 (see, for example, FIGS. 7–14) on display area 222a–b. The Application Agent API is part of the UCA that is implemented by the Application Agent layer 264. The Agent communicates with the API and with the server itself through a backup/restore server communication layer 266, which in a preferred embodiment is EBCI software available from EMC Corp.

Table 5 shows callable functions of the UCA API that are typically not shared with the other API'S:

TABLE 5

UCA_StringMap- Given a text string from a dialog info structure return the user readable text string from the resource file.
UCA_AddTreeField- Pass the user selected CC_TreeField_ty structure to the agent.
UCA_GetNextDialogInfo- Provides a dialog structure to the caller
UCA_SetDialogInfo- Pass the updated CC_DialogInfo_ty structure to the agent.
UCA_StartSession- Starts a UCA session.
UCA_GetPrevDialogInfo: Gets the previous dialog structure.
UCA_GetFirstChild- Get the next child node in the CC_TreeField_ty structure.
UCA_GetNextSibling- Get the next sibling node in the CC_TreeField_ty structure.
UCA_StartJob- Start a job through UCA (either backup or restore).
UCA-GetProgressDialogInfo- Returns a CC_DialogInfo_ty structure that will contain column header information for progress dialog.
UCA_GetProgressData- Returns a UCA_Progress_ty structure that will contain progress information for the session.
UCA_Cancel- Cancel a job.
UCA_EndJob- Ends a job during the current UCA session.
UCA_EndSession- Ends a UCA session.
UCA_GetErrorString- Obtain the error string for a given error.
UCA_IsSuccess- Return TRUE or FALSE depending of the severity level of the status being passed into this function.
UCA_IsWarning- Return TRUE or FALSE depending of the severity level of the status being passed into this function.
UCA_IsInformational- Return TRUE or FALSE depending of the severity level of the status being passed into this function.
UCA_IsCritical- Return TRUE or FALSE depending of the severity level of the status being passed into this function.

UCA API Descriptions

Below is a description of the callable functions of the UCA API described in Table 5:

UCA_StartSession—The UCA_StartSession function call will start a single session. Within each session only one backup or restore can be performed. If the user desires the GUI to perform another backup or restore then the UCA_EndSession must be called before the next call to UCA_StartSession. A pointer to a UCA_SessionHandle_ty data structure will be returned. This session handle will be used for all subsequent calls to any UCA API function calls.

UCA_GetNextDialogInfo—The UCA_GetNextDialogInfo function is called to get the next CC_DialogInfo_ty data structure in the UCA session sequence. The CC_DialogInfo_ty structure contains enough information for the GUI to create and display a GUI screen. On the first call to UCA_GetNextDialogInfo a list of display names that correspond to the application agents that support the UCA API will be returned in the CC_DialogInfo_ty data structure (i.e. "Microsoft Exchange" or "Microsoft SQL Server").

UCA_AddTreeField: This API is called when the dialog is a tree dialog and before the call to UCA_SetDialogInfo. The GUI needs to call this function for each node in the tree that the user has selected. The UCA API in turn will then call UCA_AgentAddTreeField. Based in information stored in the CC_TreeField_ty structure the agent will determine what to do with this particular node in the tree. At a minimum the agent will extract and store information from the CC_TreeField_ty structure. Each node in the tree represents an entity that the agent needs to operate on. It could be a database name for Microsoft SQL Server or a storage group name for Microsoft Exchange. After UCA_AddTreeField has been called for every selected node in the tree the GUI must call UCA_SetDialogInfo to process non-tree related dialog information.

UCA_SetDialogInfo: This API call is used to pass the updated CC_DialogInfo_ty structure to the agent. The agent will then interpret the user response and create a new dialog for the GUI when UCA_GetNextDialogInfo is called. Assume the current GUI screen got displayed to the user from a previous call to either UCA_GetNextDialogInfo. In this case, the GUI will accept the user repose and set values in the CC_DialogInfo_ty structure accordingly.

UCA_GetPrevDialogInfo: This API function is called to get the previous CC_DialogInfo_ty structure in the UCA session sequence. The CC_DialogInfo_ty structure contains enough information for the GUI to create and display a GUI screen.

UCA_GetFirstChild: This function is called to get the child of a given CC_TreeField_ty structure. The entire tree structure would have been returned to the GUI in a call to UCA_GetNextDialog or UCA_GetPrevDialog.

UCA_GetNextSibling This function is called to get the siblings of a given CC_TreeField_ty structure. The entire tree structure would have been returned to the GUI in a call to UCA_GetNextDialog or UCA_GetPrevDialog.

UCA_StartJob: This function starts a job during the UCA session. This is an asynchronous operation, which returns to the caller immediately after the job has been successfully started within a separate thread. The caller must use the UCA_GetProgressData call to get status and progress information for the job.

UCA_GetProgressDialogInfo: This function will return a CC_DialogInfo_ty structure to the caller. The information returned will represent how the GUI should display the progress dialog. The caller must call UCA_GetProgressData to retrieve progress information for a running session.

UCA_StringMap: This function will return a text string given a text string tag. Hence the name UCA_StringMap. It will map a given string to another string. The UCA API is in part based on the Full GUI Configuration (FGC) Architecture. The FGC dialog info structure has text string tags to represent things like dialog titles. For example the tag returned in a FGC dialog structure might be SQL_Q1_TILE, but the value of SQL_Q1_TILE is "Enter username". The UCA_StringMap function will map SQL_Q1_TILE to "Enter username". The client application will have to call UCA_StringMap to convert any text tag before displaying them to the user.

UCA_GetProgressData: This function will return a UCA Progress_ty structure to the caller. One data structure will be returned that represents progress for the entire session. The information returned would be application specific. This data structure is essentially a matrix of strings. Each cell in the matrix will become a cell in the GUI progress window. All of the cells are of the type (char *). The number of rows and the number of columns are store with the UCA_Progress_ty structure. The call to UCA_GetProgressDialogInfo returns the column header information. The number of columns returned from UCA_GetProgressData will always match the number of columns returned from UCA_GetProgressDialogInfo. More than 1 row can be returned because some application can perform backup or restore on multiple objects at the same time.

The status that is returned from this function represents the state of the running job. This call is synchronous. The intent is for the caller of this API to wait at least a few seconds before calling it again for updated status. With that in mind there is a possibility that a state change for a particular portion of a job might be missed. To deal with this problem an array of strings will be returned to the GUI. The agent will update this string array if the agent has anything important to log as far as state change goes. The array is called message and is stored with the UCA Progress_ty structure. A variable called message_row_count will be set to the number of messages that are stored in the array. If the count is zero then the GUI will not update any status information. If the message count is not zero then the GUI will read each element in the array and display the messages to the user. Presumably in a scrolling log window. The message array will get reset every time a call to UCA_GetProgrssData is made.

This function will return E_SUCCESS or E_RUNNING. If E_SUCCESS is returned that means the job has finished and the final status of the job will be returned on the UCA_EndJob function call. A value of E_RUNNING means that the job is still in progress.

UCA_Cancel: This function is called to cancel the current job in the UCA session. This is an asynchronous operation, which returns to the caller immediately. The caller must use the UCA_GetProgress call to determine the status of a job. This function can be called anytime after the UCA_StartSession call.

UCA_EndJob: This function is called to end the current job in the UCA session. It must be called after UCA_GetProgressData returns E_SUCCESS and before the call to UCA_EndSession. This function gives the agent a chance to perform any cleanup for the current job. It also returns the final status of the job to the client application. The call to UCA_GetProgressData will return E_SUCCESS when a job has finished successfully of in error. The call to UCA_EndJob will then give the client application the final status of the job.

UCA_EndSession: This function is called to end the UCA session with the current UCA app agent. In general it will be called when the client application (i.e. GUI) is about to shutdown.

UCA_GetErrorString: The UCA_GetErrorString function is called to obtain an error string for the corresponding status code.

UCA_IsSuccess: This function is called to determine if the given error code being passed into this function has a severity level of success.

UCA_Is Warning: This function is called to determine if the given error code being passed into this function has a severity level of warning. In this case the GUI will put up a pop up dialog box with Yes and No buttons on it. It would ask if the user wants to continue.

UCA_IsInformational: This function is called to determine if the given error code being passed into this function has a severity level of informational. In this case the GUI will put up a pop up dialog box with an OK button on it.

UCA_IsCritical: This function is called to determine if the given error code being passed into this function has a severity level of critical. A critical error is an error that could prevent processing from continuing (fatal error). In this case the GUI will disable all dialog buttons except for cancel.

UCA_IsProblem: This function is called to determine if the given error code being passed into this function has a severity level of problem. A severity of problem is an error that could cause a problem with processing to continue, but would not cancel the session (non-fatal error). In this case the GUI will display a pop up error dialog with the OK button, but keep the next, previous and cancel dialogs active in the wizard.

UCA Data Structures

Following are preferred data structures useful in the preferred architecture using the above-described UCA API's and as implemented by the Application Agent API (yielded by cooperation between layers 262 and 264 of FIG. 5):

(1) UCA_SessionHandle_ty: This is the external handle the caller will use. The caller (e.g., an application agent) will need to pass this data structure into each UCA call;

(2) UCA_Handle_ty: An internal session handle that is passed into each UCA call; and (3) UCA_Progress_ty: A matrix of strings that represent progress for a given client. Each cell of the matrix is a char * that contain text that the GUI should put into the progress dialog.

In a preferred embodiment, the UCA Agent API is the counter part to the UCA API. The UCA API is the external interface that the caller (in most cases the GUI) will use to interface to the UCA elements. An advantage of this technique is that once the UCA API is available, the Agent API may correspond directly in a mating fashion referred to as a "plug and play" architecture. In addition the UCA API layer provides a layer of abstraction to mask out any inconsistencies by the function caller.

The UCA API will load the agent shared library of function calls sometimes referred to as a Dynamic Link Library (DLL) and get function pointers to the UCA Agent API interface. The agent implementers must implement each of these UCA Agent API calls. The agent can be written in C or C++ and is responsible for creating a new dialog structure for the backup or restore sequence. The GUI will call UCA_GetNextDialogInfo, which in turn will call the agent function UCA_AgentGetNextDialogInfo. The function UCA_AgentGetNextDialogInfo creates the dialog structure and passes it back to the GUI as an output parameter in the UCA_GetNextDialogInfo call.

The first call to UCA_GetNextDialogInfo will preferably read the operating system's registry (not shown) to get a list of UCA enabled agents and create a dialog structure and pass it back to the GUI without any interaction from an agent. This allows the user to specify which agent (i.e. by application intended for data backup) to load. For example, if the user has both Microsoft Exchange and Microsoft SQL Server backup clients installed then the user will have the ability to specify through the GUI which application they would like to use to do a backup or restore. Therefore, the first dialog will be implemented in the UCA API presenting a Universal GUI (discussed in relation to FIG. 6 below) not the UCA Agent API. Once an agent has been selected then the DLL will get loaded and the UCA Agent API will take over. Once the agent is loaded the UCA API becomes in part a pass through.

Table 6 shows the preferred function calls for the UCA Agent API:

TABLE 6

| | |
|---|---|
| UCA_AgentStartSession | The agents implementation of UCA_StartSession. This call is made to starts a UCA session. |
| UCA_AgentGetNextDialogInfo | The agents implementation of UCA_GetNextDialogInfo. This function processes the CC_DialogInfo_ty data structure for application specific requirements. |
| UCA_AgentAddTreeField | The agents implementation of UCA_AddTreeField. The agent will process the user selected CC_TreeField_ty structure for each node in the tree. |
| UCA_AgentSetDialogInfo | The agents implementation of UCA_SetDialogInfo. The agent will process the CC_DialogInfo_ty data structure for the selected dialog. |
| UCA_AgentGetPrevDialogInfo | The agents implementation of UCA_GetPrevDialogInfo. The agent will process the CC_DialogInfo_ty data structure for the previously selected dialog. |
| UCA_AgentGetFirstChild | The agents implementation of UCA_GetFirstChild. This function will get the next child node in the CC_TreeField_ty structure. |
| UCA_AgentGetNextSibling | The agents implementation of UCA_GetNextSibling. This function will get the next siblin node in the CC_TreeField_ty structure. |
| UCA_AgentStartJob | The agents implementation of UCA_StartJob. This function will process the start job request during the UCA session. |
| UCA_AgentGetProgressDialogInfo | The agents implementation of UCA_GetProgressDialogInfo. This function returns a CC_DialogInfo_ty structure that will contain column header information for progress dialog. |
| UCA_AgentGetProgressData | The agents implementation of UCA_GetProgressData. This function returns a UCA_Progress_ty structure that will contain progress information for the session. |
| UCA_AgentEndJob | The agents implementation of UCA_EndJob. This function performs post processing and/or cleanup operations of a job. This function will end the job during the current UCA session. |
| UCA_AgentCancel | The agents implementation of UCA_Cancel. This function will process the cancel request for the current UCA session. |
| UCA_AgentEndSession | The agents implementation of UCA_EndSession. This function ends a UCA session. |

FIG. 6 shows a state and logical flow diagram of interaction of the above-described API's and other elements of the system of FIG. 1 A Generic or Universal GUI 250-1 is preferably presented to a user (e.g. a system administrator) on a client computer 113a–b by the API being implemented by the Application Agent. This generic aspect is important and is discussed in detail below. In general it means that the interface is not application specific. If the user interface is intended for configuration only it may be presented only on the backup server. In either case, when the interface is used for configuration a call is made by at least some portions of the Logic 207 to a CCAPI function, (e.g., CC_StartConfig)

through the API 252. Then in general a client application to configure is selected and its specific Application Agent 254 is loaded in memory. From this point dialogs occur using the user interface for configuring the client application for a backup or restore operation.

Referring again to FIG. 6, in general the steps are the same for carrying out a backup or restore operation, with some specific differences discussed now. If for a backup or restore operation, the API called is from the UCA API function calls discussed above. The respective API which is part of Logic 207 or 206*a–b* is loaded on client computer 113*a–b*.

As mentioned above, the UCA API is a generic layer that applies a generic interface such as a GUI that will generally provide an interface to for a backup and restore operation. The UCA API implements a generic interface so application agents can be written to accomplish a specific task. This is different from prior art interfaces that are application specific. A specific task in terms of the preferred EDM is supporting a client application for backup and restore. An example of this is an agent for Microsoft Exchange or Microsoft SQL Server. The specifics of how to perform a backup or restore are written in the agent application, but the interface is common.

The agent application will implement code that supports the UCA Agent API. The UCA API should require little or no modification for the agent developer. Since the UCA API is generic the intent is that the UCA agent developer will not need to make any changes in that code to support a new application. In many cases the UCA API code will just pass data off to the agent for processing. Only things that are very generic will be written in the UCA API. In most cases only the agent knows what the right thing to do is. Therefore, you will see much of the UCA API code just pass data off to the agent. In most cases the agent has a corresponding function for each UCA API call. For example, the UCA API has UCA_StartSesion and the agent API has a UCA_Agent-Startsession call.

The UCA Agent API functions are implemented by a respective Application Agent 252 that resides on the client computer. The Application Agent that is specific to a particular Application works with the UCA Agent API and the data structures 250-2 to create and collect application specific data that resides in memory 209*a–b* on the client. These data structures are then shared by the API 252 and Application Agent 254.

The Application Agent 254 uses the data structures defined in 250-2 and discussed above to create a dynamic dialog sequence, and using the data structures and management functions of the CBAPI's discussed above as shown in state box 250-3.

In general, the Universal GUI has no knowledge of the application. It is a universal/generic GUI. It only knows how to interpret the data structures. Normally a GUI is specific to an application. For example, if the user wanted to display a dialog the developer would modify the code that actually displays the GUI. But with the invention, a user could modify the Application Agent 254 code to change a dialog. Once completed the new dialog would appear with no change to the Universal GUI 250-1.

The Universal GUI 250-1 is code that makes calls to the operating system 210*a–b* (FIG. 3) to create and display the GUI. For example, the operating system may have its own API's, e.g. Microsoft's MFC GUI API. This code creates and displays the initial Universal GUI that interacts with the API's of this invention as shown in FIG. 6. The API creates data structures that cooperate with the Universal GUI for the application software 208*a–b* and its associated data, which may also be on the client computer or on the data storage system 119.

In the case of backup, the Application Agent 254 reads data from the Application Software 208*a–b* (e.g., a Microsoft SQL Server). The Application Agent then writes data to the Backup server 202, which in the preferred embodiments is an EDM via the backup/restore server communications, denoted as the EBCI interface. The Application (i.e. Microsoft SQL Server) is running on the client machine and the data may be on storage device 115 or 116 of data storage system 119. In the case of restore the data movement path is just reversed (as shown in FIG. 3). Communication may be made directly to the data storage system for either backup or restore via a high-speed channel 123 (FIG. 1).

Reference is now made to FIGS. 7–23 which demonstrate an example of the capabilities provided by this invention. The examples pertain to use of the UCA API for backup and restore operations, but similar function is of course available for configuration with the Configuration API's discussed above.

FIGS. 7–13 show the GUI's enabled by this invention being used for a backup operation, and FIGS. 14–23 show the GUI's being used for restore operation. For the sake of simplicity, and since much of the data and functions are shared between the respective API is as described above configuration examples are shown at least implicitly as part of the operations of FIGS. 7–23, and occurring at the client computer.

Figure 7:
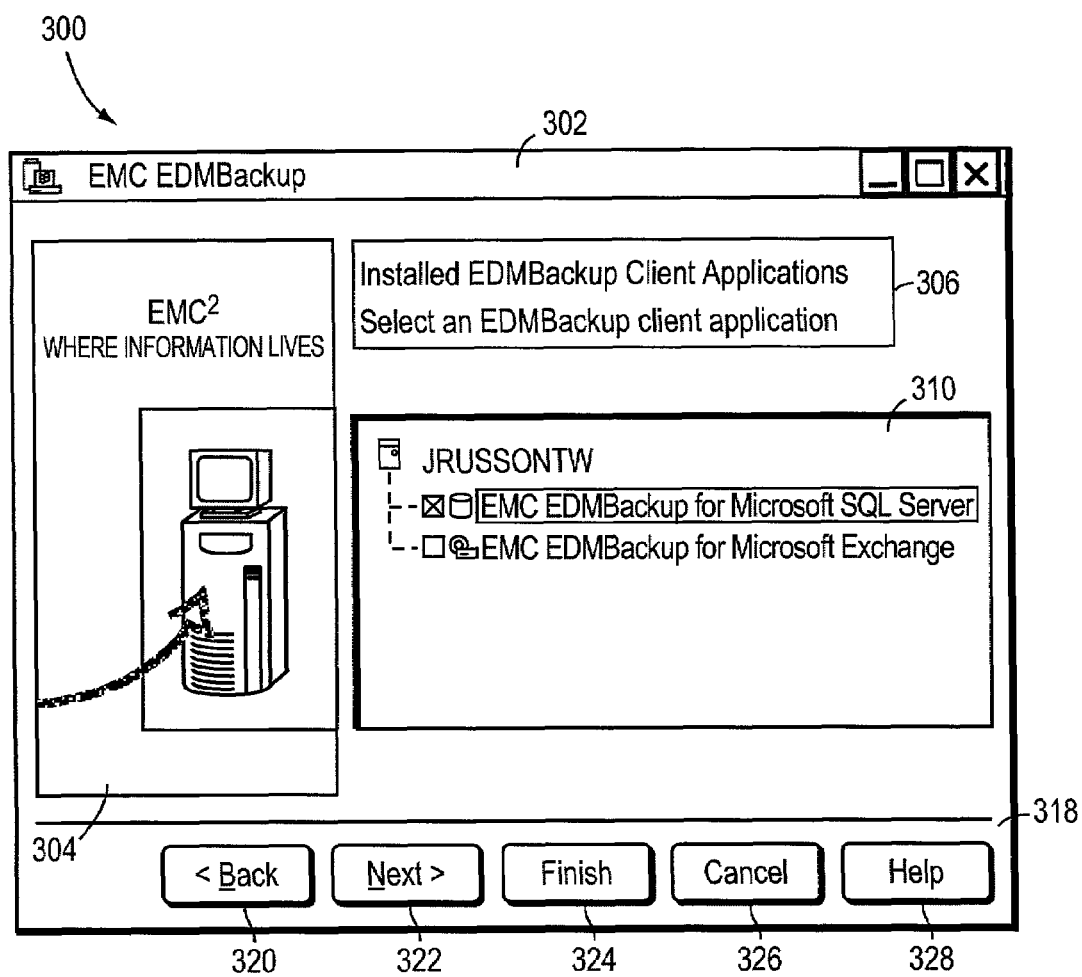
FIG. 7 shows a preferred graphical user interface created, shared, and used by the elements of FIGS. 1–6.

Referring to FIG. 7, GUI 300 presented on display to 222*a–b* includes title bar 302, logo area 304, information and action area 306, and application selection area 310. Area 306 informs the user that displayed below are certain backup client applications. This area also informs the user of requesting action to select a backup client application. Area 310 displays the particular applications and provides a selection box, which may be clicked upon for selection of a client backup application. GUI 300 also includes menu buttons 320–328. Button 320 is the "Back" action. Button 322 is the "Next" action. Button 324 is the "Finish" action. Button 326 is the "Cancel" action. Button 328 is the "Help" action.

Figure 8:
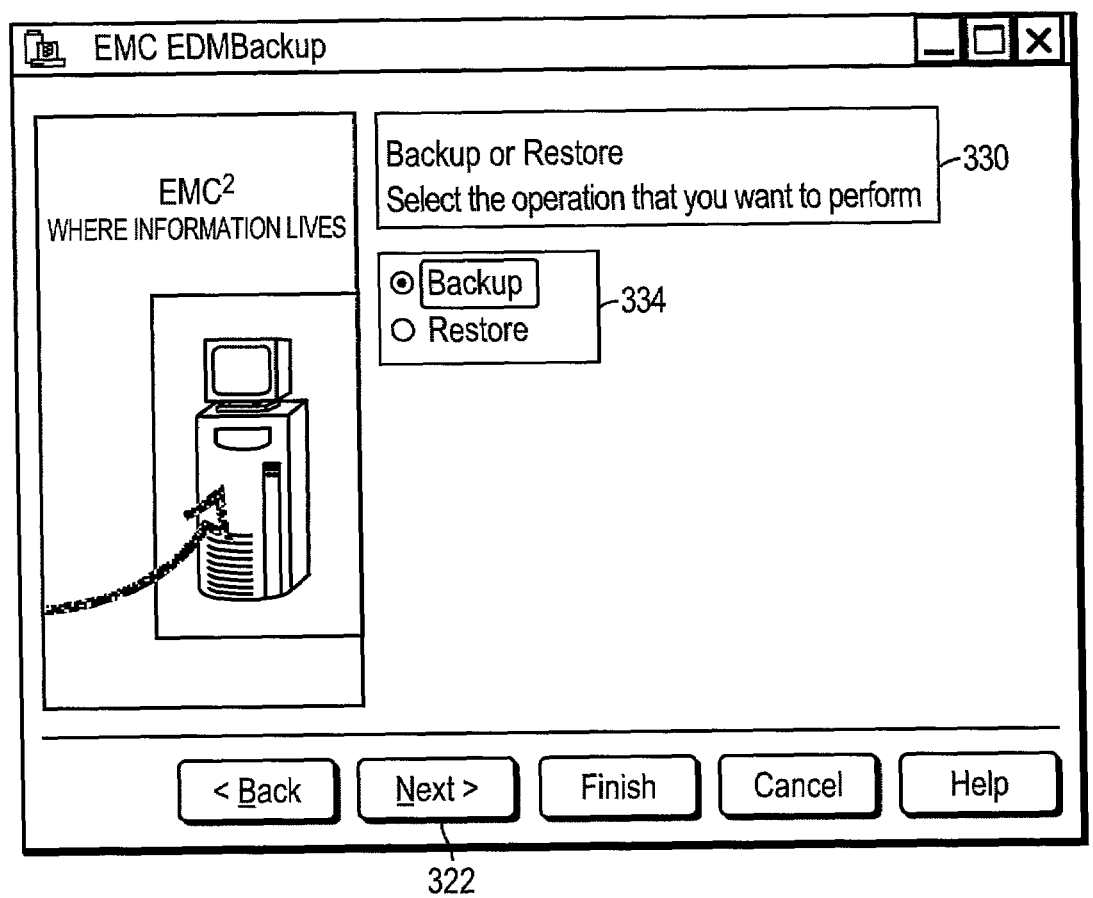
FIG. 8 shows another preferred graphical user interface created, shared, and used by the elements of FIGS. 1–6.

Referring to FIG. 8, the GUI displays an information area 330 that informs the user to select either a backup or restore operation. User may select one of the operations in area 334, and in this example has selected a backup operation. Clicking on the next button 322 will present the next display screen.

Figure 9:
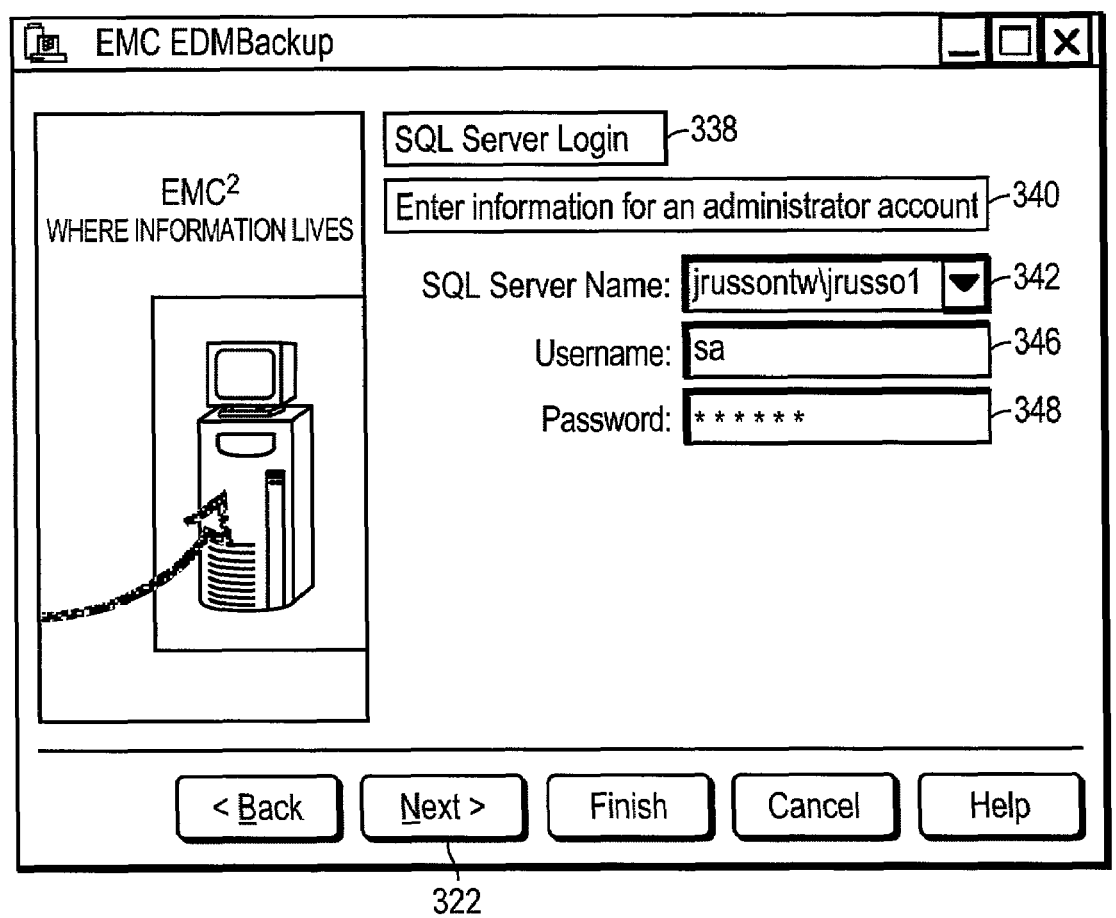
FIG. 9 shows another preferred graphical user interface created, shared, and used by the elements of FIGS. 1–6.

Referring to FIG. 9, the GUI displays a logon screen for the Microsoft SQL Server application selected in area 310 (FIG. 7). Area 338–348 allows the user to enter all required information for logging on to the particular SQL Server. Clicking on the next button 322 will present the next display screen.

Figure 10:
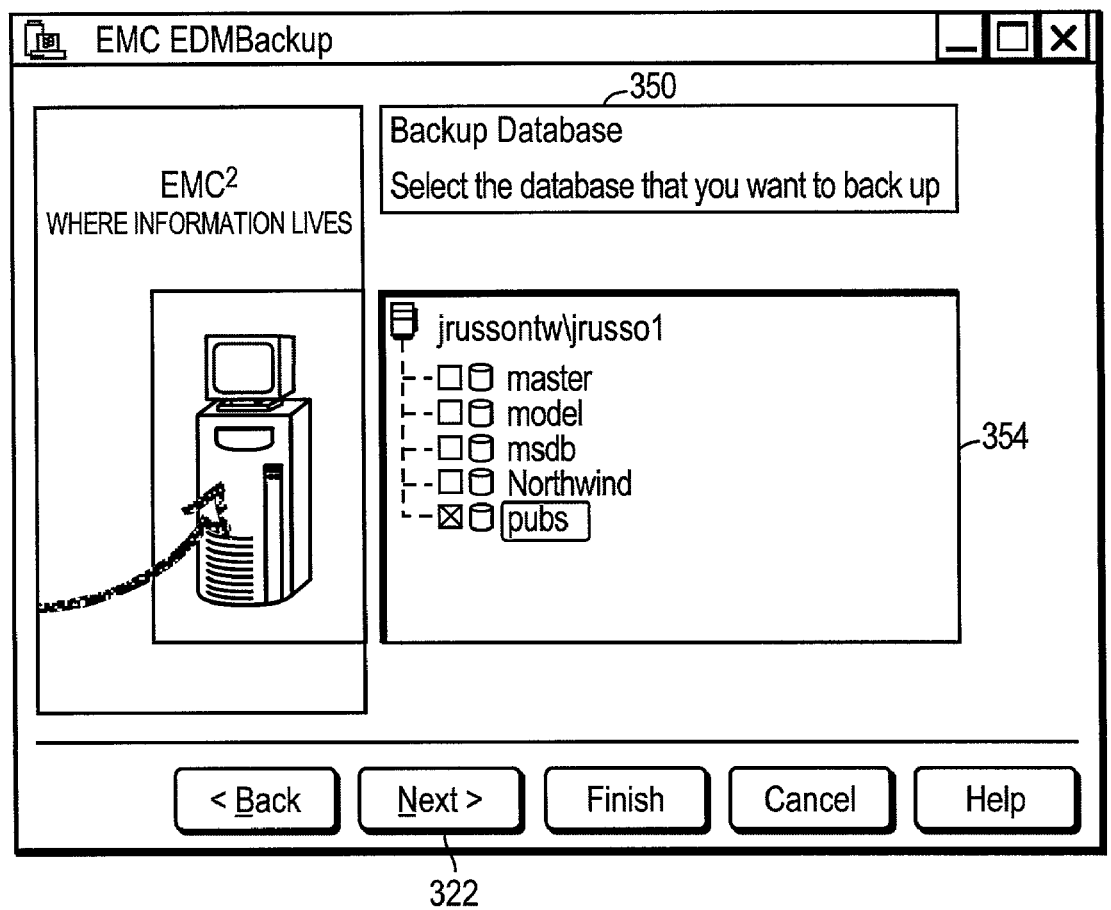
FIG. 10 shows another preferred graphical user interface created, shared, and used by the elements of FIGS. 1–6.

FIG. 10 shows the next GUI screen presented to the user. Information area 350 informs the user to select a database for backing up. In selection area 354, the user may select a particular database and in this example has chosen the "pubs" database. Clicking on the next button 322 will present the next display screen.

Figure 11:
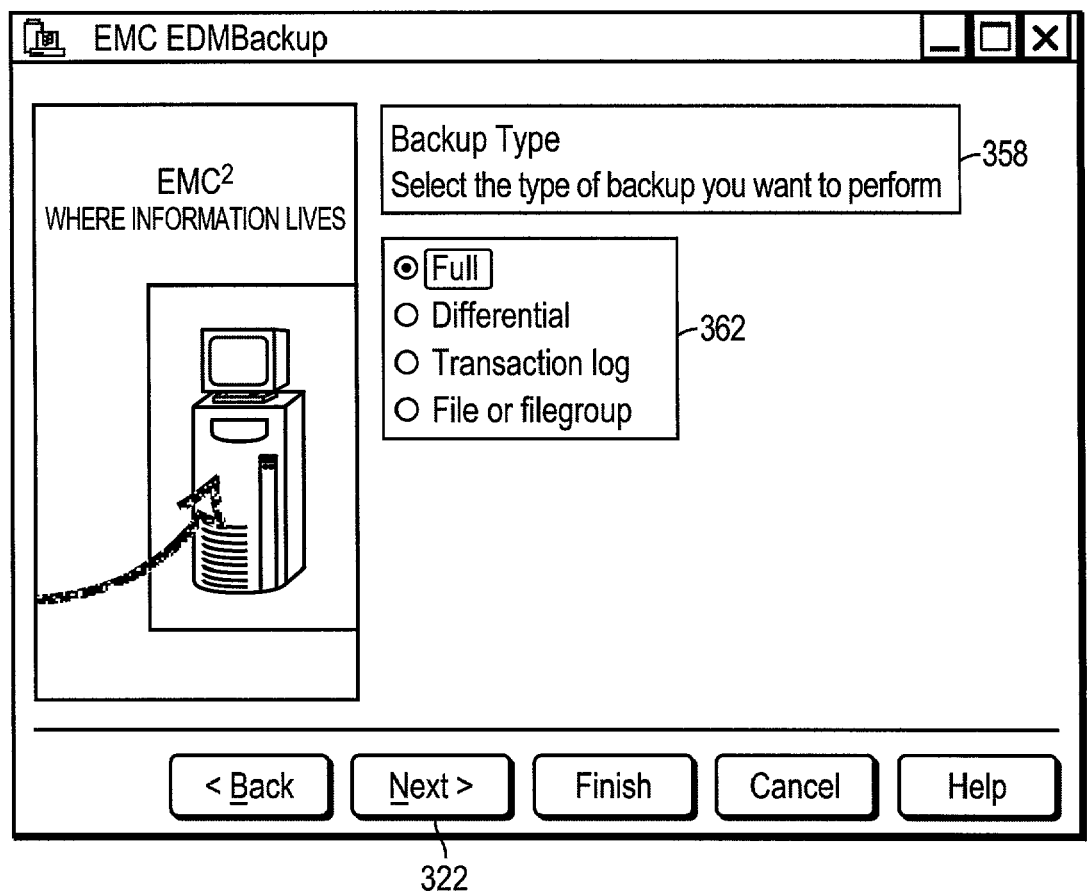
FIG. 11 shows another preferred graphical user interface created, shared, and used by the elements of FIGS. 1–6.

The GUI screen shown in FIG. 11 allows the user to select the type of backup desired. Information area 358 informs the user to select a backup type. Choices are presented in area 362. Such choices may include "Full," "Differential," "Transaction log," and "File or file group." In this example the user has selected "Full", meaning all the data associated with the application will be backed up. Clicking on the next button 322 will present the next display screen.

Figure 12:
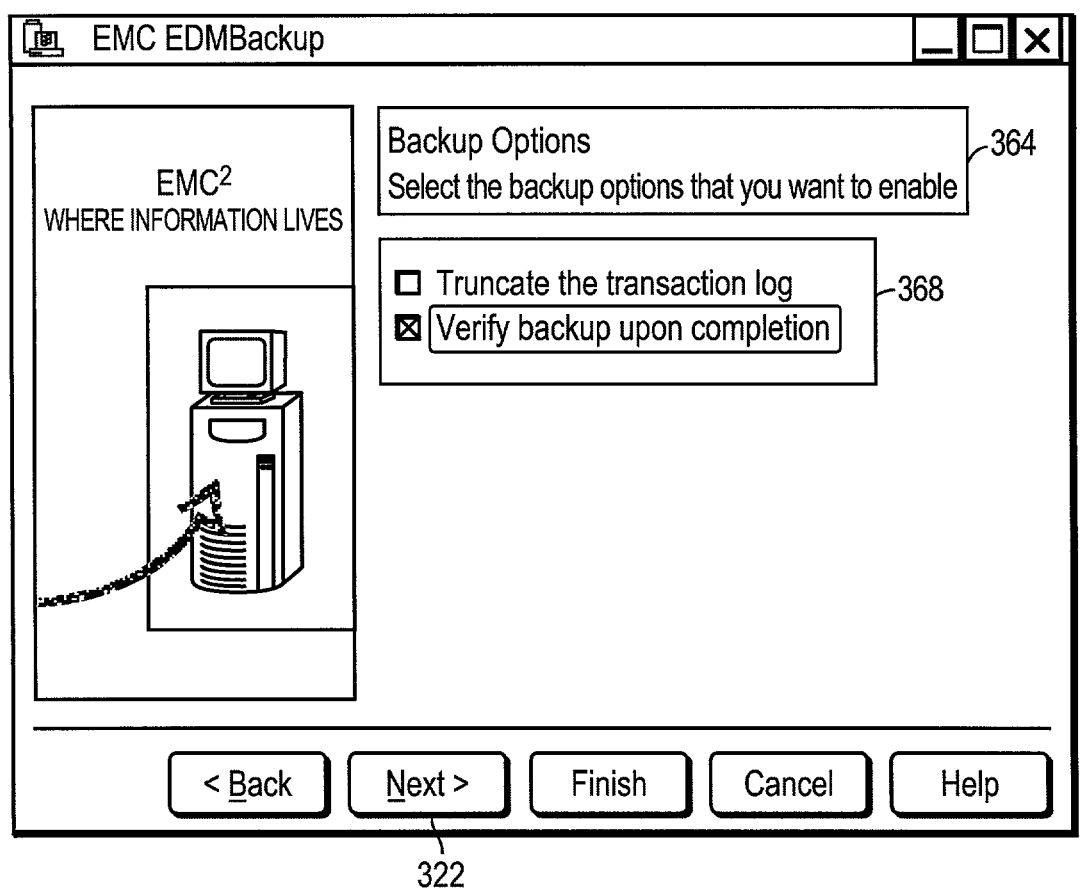
FIG. 12 shows another preferred graphical user interface created, shared, and used by the elements of FIGS. 1–6.

The GUI screen shown in FIG. 12 allows the user to select options for backup. Information area 364 informs the user to select such options. Choices are presented in area 368. Such choices may include "Truncated transaction log," and "Verify backup upon completion." In this example the user has selected the choice of verifying the backup operation. Clicking on button 322 will present the next display screen.

Figure 13:
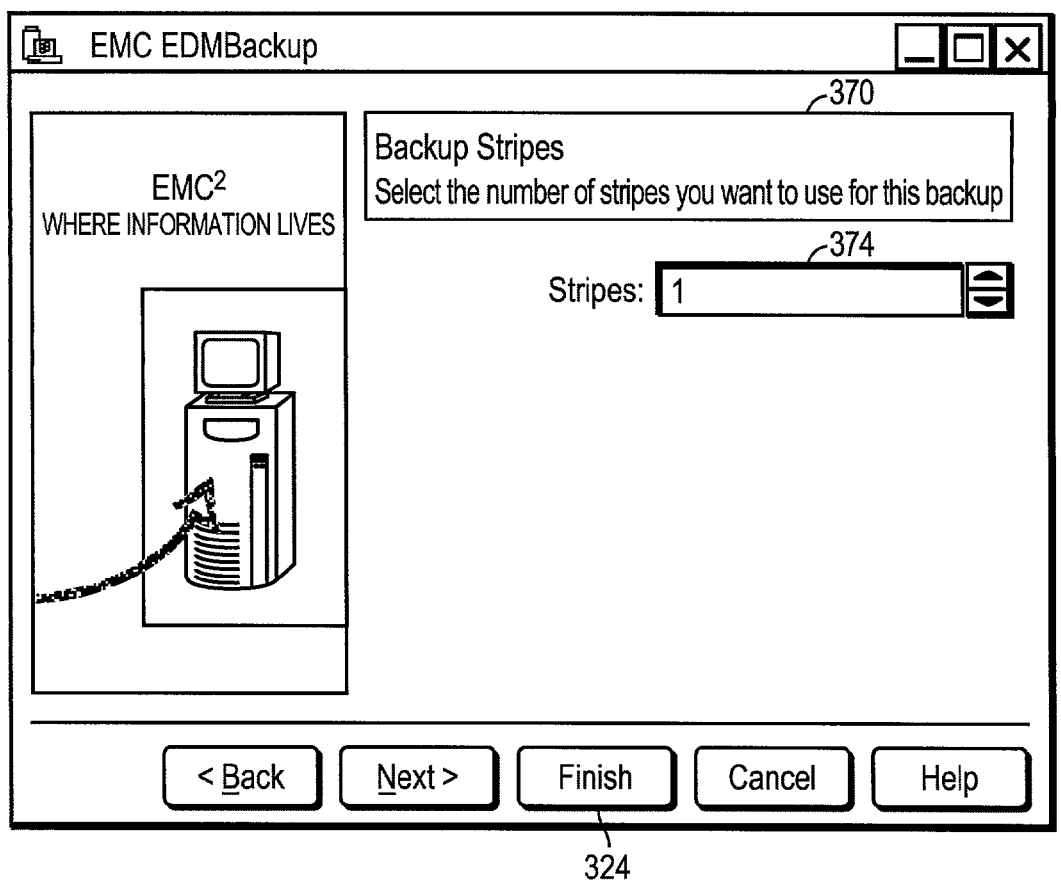
FIG. 13 shows another preferred graphical user interface created, shared, and used by the elements of FIGS. 1–6.

The GUI screen shown in FIG. 13 allows the user to select the number of stripes (i.e., simultaneous data streams) to use for backup. Information area 370 informs the user to make such a selection. The number may be entered in area 374. Now the backup operation is fully enabled for operation, and Clicking on the Finish button 324 will start the backup.

Figure 14:
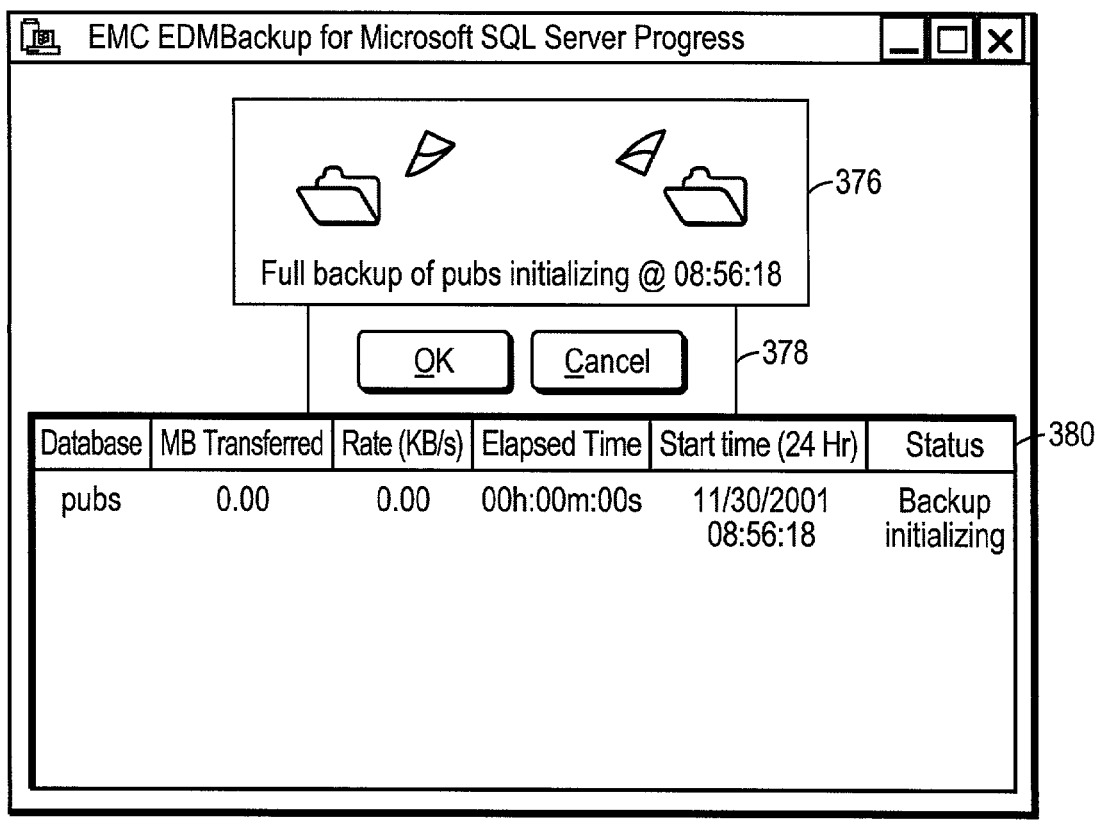
FIG. 14 shows another preferred graphical user interface created, shared, and used by the elements of FIGS. 1–6.

FIG. 14 shows the progress for the Microsoft SQL Server backup. Information area 376 informs that a full backup of the selected pubs database began initializing at a certain time. By selecting an intervening choice of either "OK" or "Cancel" in area 378 the user may affect this operation. Information area 380 informs the user of relevant statistics such as the identity of the database, the amount and rate of data transfer, the elapsed time and start time, and the general status of the operation. This data is application specific and is controlled by the Application Agent 254.

Figure 15:
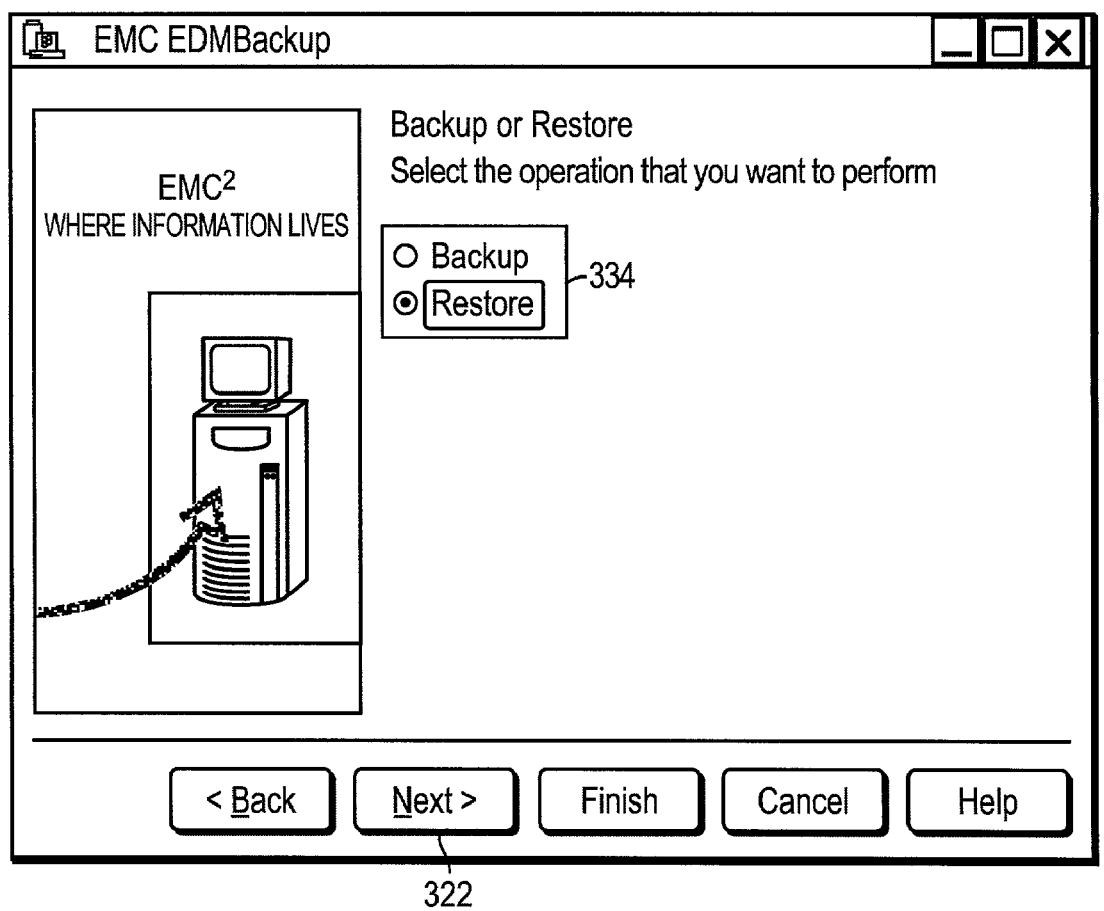
FIG. 15 shows another preferred graphical user interface created, shared, and used by the elements of FIGS. 1–6.

FIGS. 15–23 illustrate using the GUI's enabled by this invention to carry out a restore operation. Referring now to FIG. 15, in this example, the user selects the restore operation in area 334. Sequentially, the screen displayed in FIG. 15 would follow one such as that shown in FIG. 7, which allowed the user to select an application for the respective operation desired. Then following FIG. 15 would be a logon screen such as that described above with reference to FIG. 9.

Figure 16:
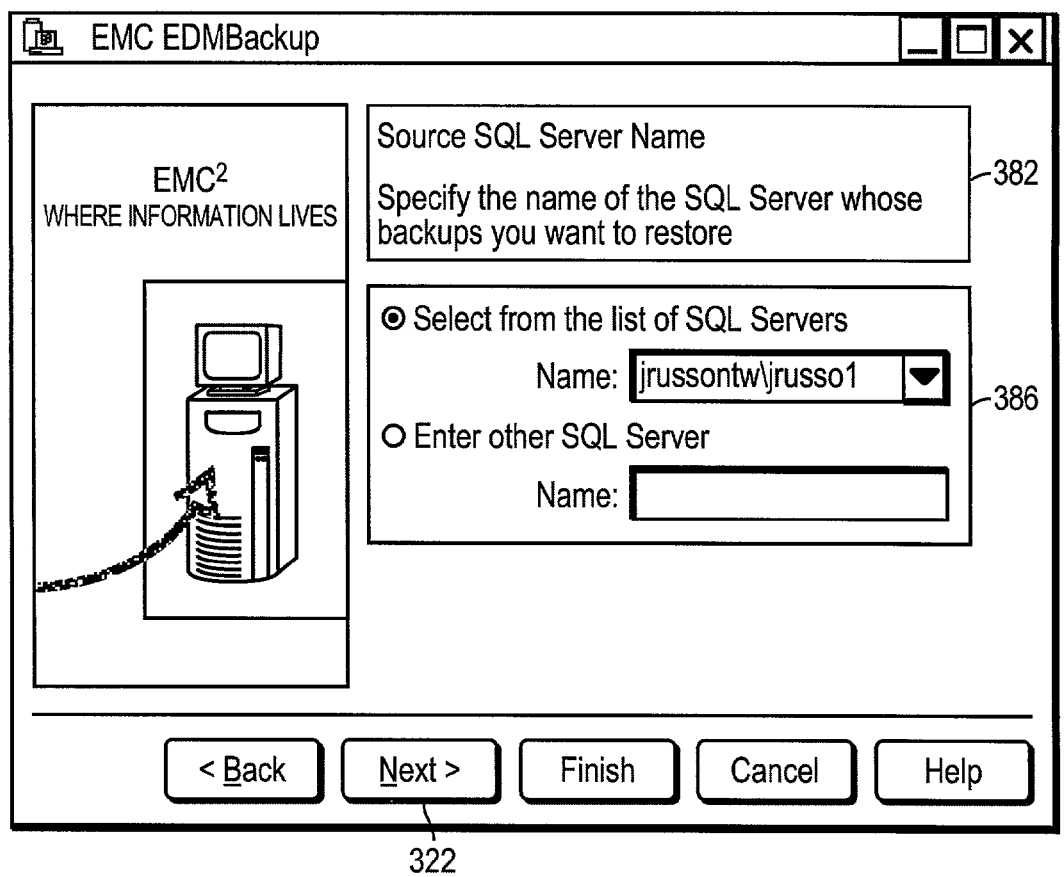
FIG. 16 shows another preferred graphical user interface created, shared, and used by the elements of FIGS. 1–6.

Referring now to FIG. 16, the user is presented a GUI screen, wherein information area 382 conveys that the user has the option to specify the name of the SQL Server whose backups need to be restored. In area 386 the user may select from the list of SQL Server's available for restore or the user can type in a name of a SQL Server whose name may not appear in the offered list. Clicking on button 322 will present the next display screen.

Figure 17:
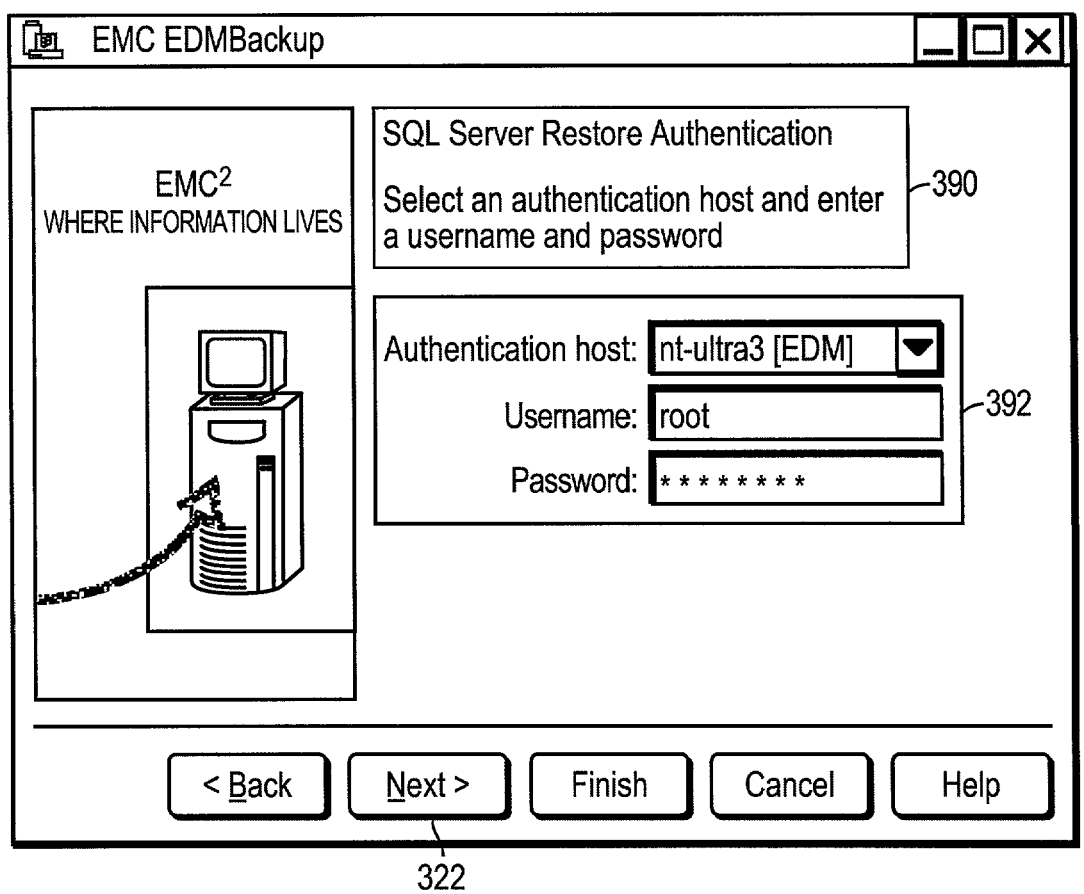
FIG. 17 shows another preferred graphical user interface created, shared, and used by the elements of FIGS. 1–6.

Referring to FIG. 17, the user is presented with a display screen informing him of an opportunity to perform SQL Server restore authentication. Area 390 informs the user to select an authentication host plus a username and password. Such information may be entered in area 392. Clicking on button 322 will present the next display screen.

Figure 18:
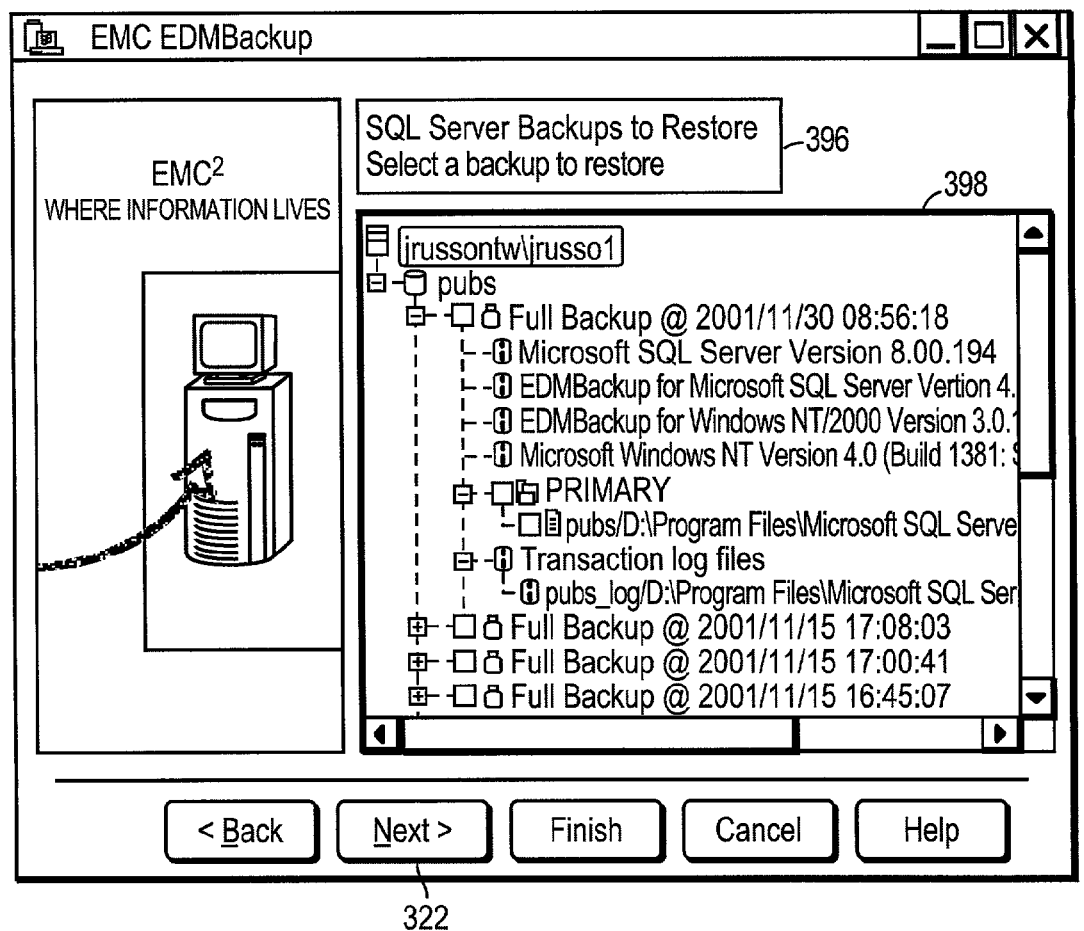
FIG. 18 shows a preferred graphical user interface created, shared, and used by the elements of FIGS. 1–6.

Next a GUI screen is presented to the user for selection of a database to restore and this screen is shown in FIG. 18. Area 396 informs the user to select a backup to restore, and such selection may be made in area 398. Clicking on button 322 present the next display screen.

Figure 19:
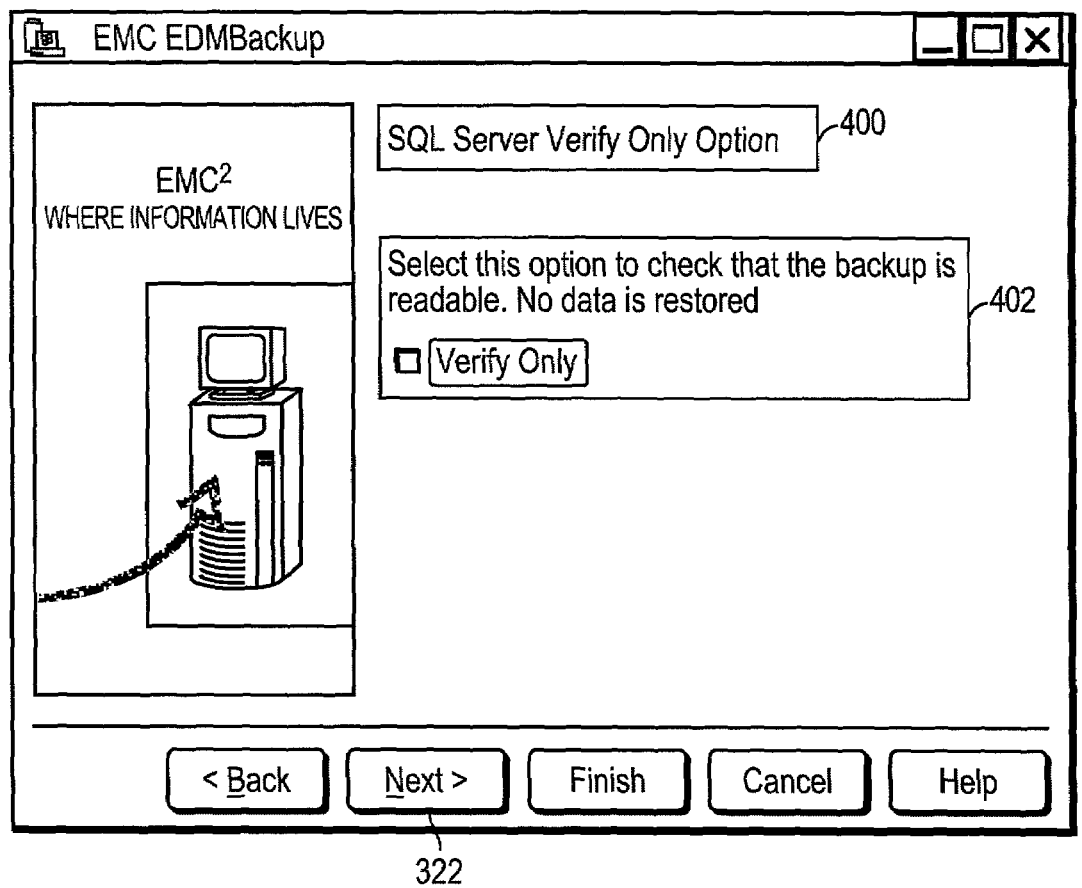
FIG. 19 shows another preferred graphical user interface created, shared, and used by the elements of FIGS. 1–6.

FIG. 19 shows the GUI screen for allowing the user to select the verify only option. Information area 400 informs user of this choice, and area 402 informs the user that upon selecting this option no data is restored. Instead the backed up data is checked to make sure that it is readable. In the example shown the user does not select this option. Clicking on button 322 presents the next display screen.

Figure 20:
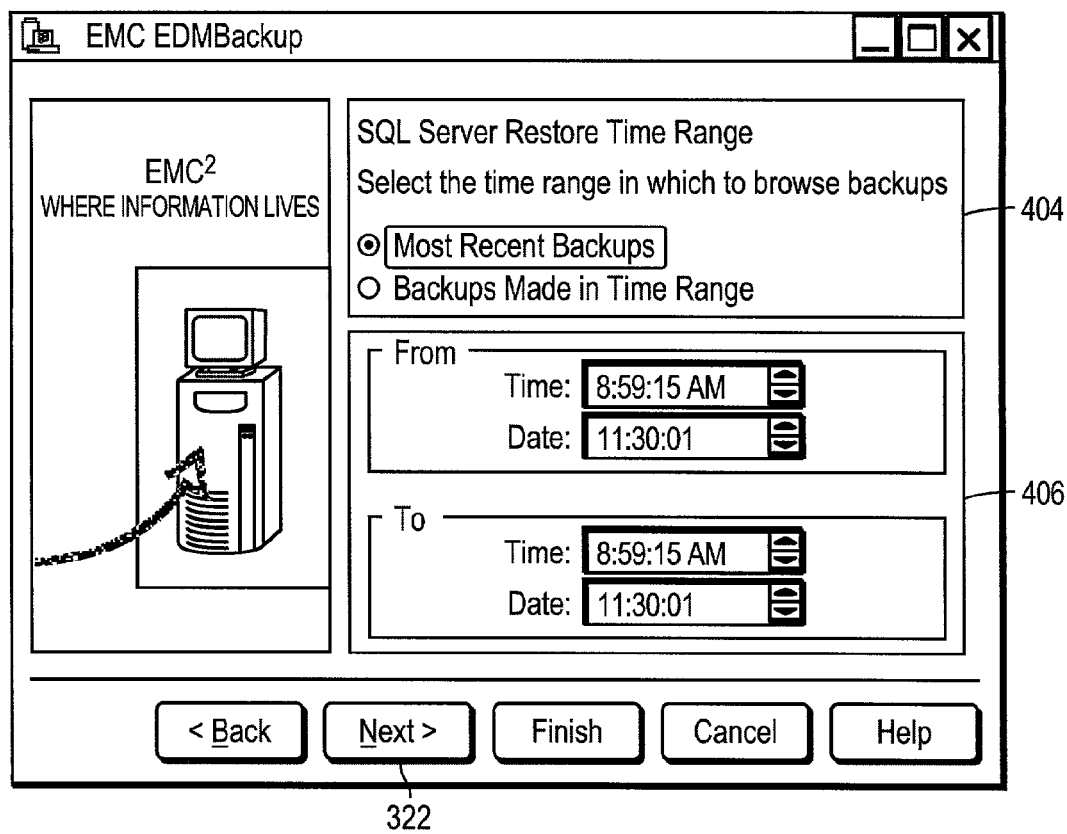
FIG. 20 shows another preferred graphical user interface created, shared, and used by the elements of FIGS. 1–6.

FIG. 20 shows the GUI screen for selection of the time range of which to browse backups. In area 404 the user may select either "Most Recent Backups," or "Backups Made in Time Range." In this example the user selects the "Most Recent Backups" option. Information area 406 presents a time range that would correspond to the option not picked. Since the option was not picked no time range is shown (in this example only the present time is displayed). Clicking on button 322 present the next display screen.

Figure 21:
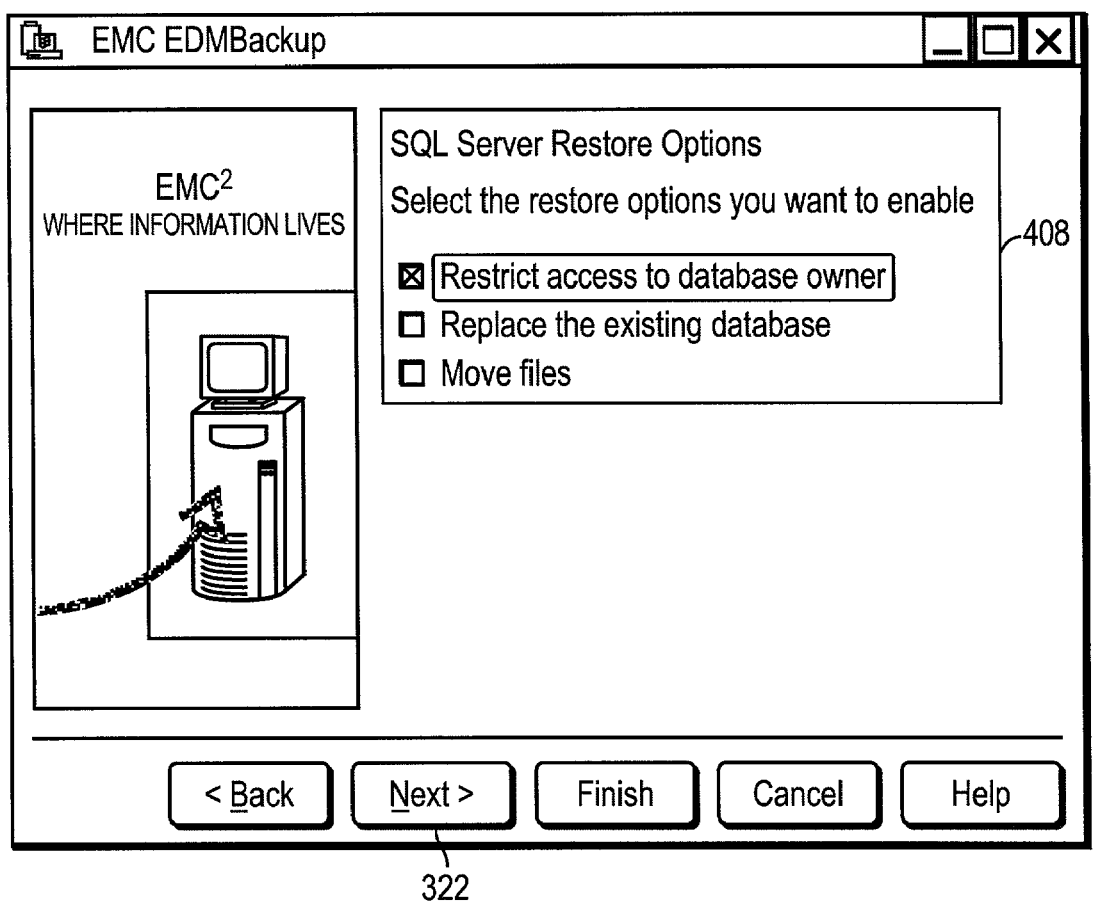
FIG. 21 shows another preferred graphical user interface created, shared, and used by the elements of FIGS. 1–6.

Referring to FIG. 21, information area 408 informs the user of SQL Server restore options. The user may select restore options desired for enabled. In this example the user selects "Restrict access to database owner". Clicking on button 322 present the next display screen.

Figure 22:
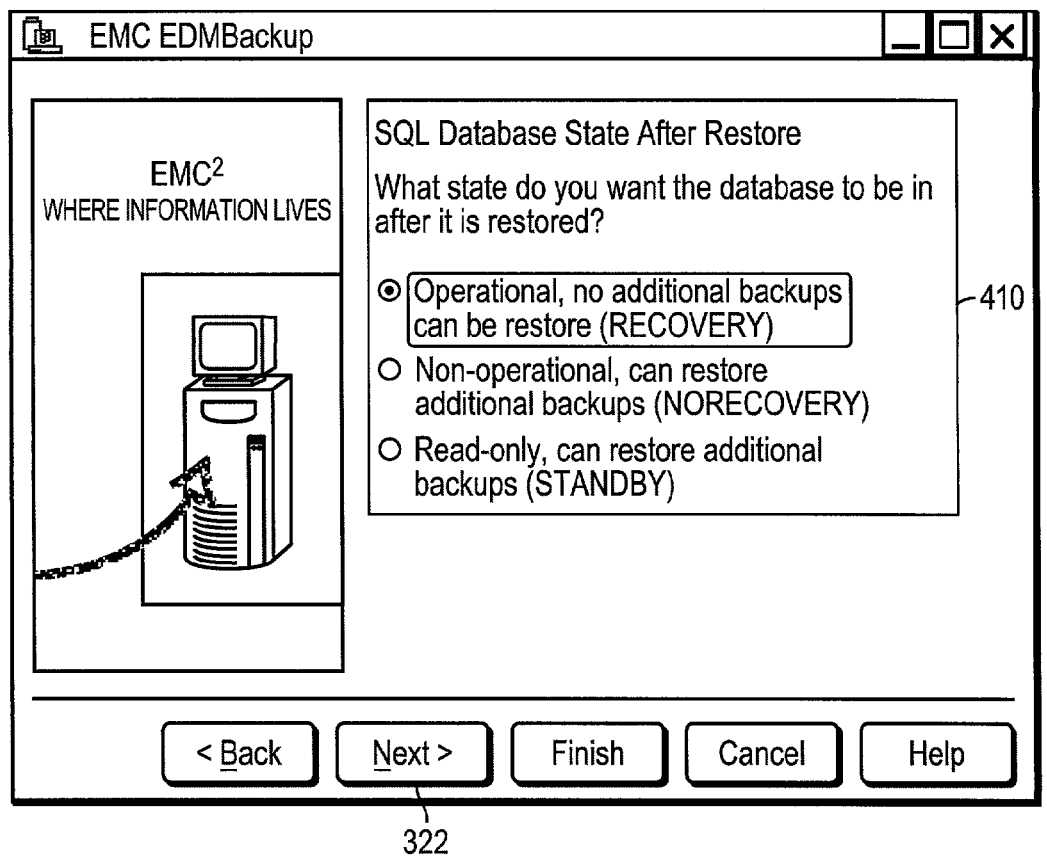
FIG. 22 shows another preferred graphical user interface created, shared, and used by the elements of FIGS. 1–6.

Referring to FIG. 22, information area 410 informs the user of an opportunity to specify the state of the SQL Server database after restore. The choices include "Recovery," "Norecovery," and "Standby." Clicking on button 322 present the next display screen.

Figure 23:
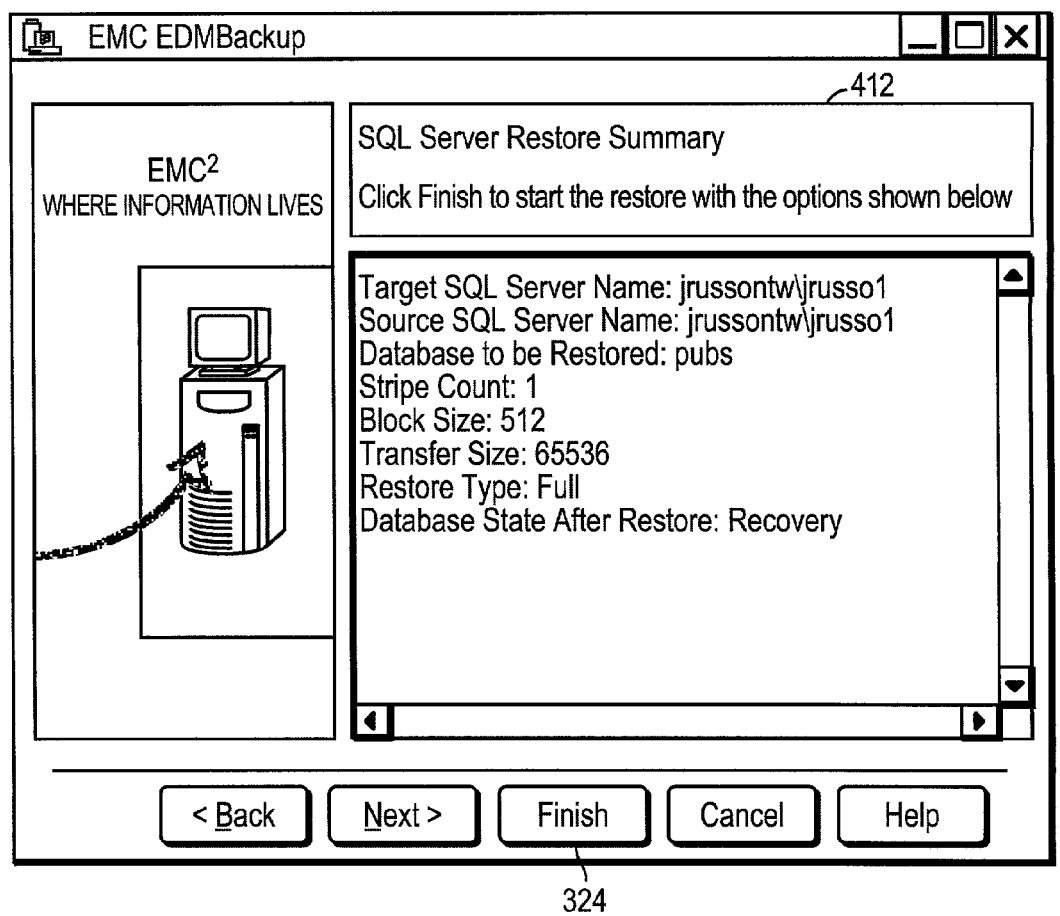
FIG. 23 shows another preferred graphical user interface created, shared, and used by the elements of FIGS. 1–6.

FIG. 23 shows a GUI screen displaying summarized results for the SQL Server restore operation. Information area 412 informs the user to click finish to start to restore operation with the options specified on the screen, which reflect the choices made by the user using the GUI interface enabled by this invention.

A system and method has been described for interfacing with a graphical user interface for backup and restore and related configuration. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for interfacing with a backup or restore client application on a backup or restore server, the method comprising the computer-executed steps of:

using a software agent for presenting a user using a computer other than the backup or restore server with a graphical or command line user interface for performing a dialogue, wherein the interface is created dynamically using data structures created by the execution of selected ones of a plurality of software functions calls, said function calls executing code associated with backup and/or restore operations; and the agent using information acquired in the dialogue for configuring for or performing a backup or restore operation on the backup or restore server, wherein either the action of configuring or performing a backup or restore operation is carried out by the agent through communications with an application program interface, wherein the functions calls are part of the application program interface.

2. The method of claim 1, wherein the data structures are shared by more than one application program interface and the agent.

3. The method of claim 2, wherein the more than one application program interface include the application program interface that is directed toward configuring a client application through cooperation with the agent for the backup or restore operation.

4. The method of claim 2, wherein the more than one application program interface includes the application program interface that is directed toward interfacing with a client application through cooperation with the agent for carrying out the backup or restore operation.

5. The method of claim 2, wherein the more than one application program interface include the application program interface that is directed toward browsing a client application through cooperation with the agent for objects to configure for or for carrying out the backup or restore operation.

6. A system comprising:
a data storage system including at least one storage device;
a computer system including a client application in communication with the data storage system, an application program interface, and a software agent for communicating between the client application and a user;
a backup or restore server in communication with the computer system and the data storage system; and
computer-executable logic in communication with the computer system and backup or restore server that enables the method steps of:
using a software agent for presenting a user using a computer other than the backup or restore server with a graphical or command line user interface for performing a dialogues wherein the interface is dynamically created using data structures created by the execution of selected ones of a plurality of software functions calls, said function calls executing code associated with backup and/or restore operations; and
the agent using information acquired in the dialogue for selectively configuring for or performing a backup or restore operation on the backup or restore server, wherein either the action of configuring or performing a backup or restore operation is carried out by the agent through communications with the application program interface, wherein the functions calls are part of the application program interface.

7. The system of claim 6, wherein the data structures are shared by more than one application program interface and the agent.

8. The system of claim 7, wherein the more than one application program interface include the application program interface that is directed toward configuring a client application through cooperation with the agent for the backup or restore operation.

9. The system of claim 7, wherein the more than one application program interface includes the application program interface that is directed toward interfacing with a client application through cooperation with the agent for carrying out the backup or restore operation.

10. The system of claim 7, wherein the more than one application program interface include the application program interface that is directed toward browsing a client application through cooperation with the agent for objects to configure for or for carrying out the backup or restore operation.

11. A program product for use with a data storage system including at least one storage device and a computer system including a client application in communication with the data storage system and a backup or restore server being and a software agent and an application program interface for communicating between the client application and a user, the product being comprised of:

computer-executable logic provided by a computer-readable medium and which is configured for enabling the following steps:

using a software agent for presenting a user using a computer other than the backup or restore server with a graphical or command line user interface for performing a dialogue, wherein the interface is dynamically created using data structures created by the execution of selected ones of a plurality of software functions calls, said function calls executing code associated with backup and/or restore operations; and the agent using information acquired in the dialogue for configuring for or performing a backup or restore operation on the backup or restore server, wherein either the action of configuring or performing a backup or restore operation is carried out by the agent through communications with the application program interface, wherein the functions calls are part of the application program interface.

* * * * *